United States Patent [19]

Shah

[11] 4,119,586

[45] Oct. 10, 1978

[54] POLYMER/POLYOL COMPOSITIONS, PROCESSES FOR MAKING SAME AND PROCESSES FOR MAKING POLYURETHANE PRODUCTS THEREFROM

[75] Inventor: Naresh Ramanlal Shah, Nitro, W. Va.

[73] Assignee: Union Carbide Corporation, New York, N.Y.

[21] Appl. No.: 797,666

[22] Filed: May 17, 1977

Related U.S. Application Data

[63] Continuation-in-part of Ser. No. 699,397, Jun. 24, 1976, abandoned.

[51] Int. Cl.$^2$ .................. C08G 18/14; C08G 18/63; C08K 5/06
[52] U.S. Cl. ................ 521/137; 260/33.2 R; 260/859 R; 528/392
[58] Field of Search ............ 260/2.5 AP, 2.5 BE, 260/33.2 R, 859 R

[56] References Cited

U.S. PATENT DOCUMENTS

| Re. 28,715 | 7/1976 | Stanberger | 260/33.2 |
|---|---|---|---|
| Re. 29,014 | 10/1976 | Pizzini et al. | 260/33.2 |
| Re. 29,118 | 1/1977 | Stanberger | 521/137 |
| 3,652,639 | 3/1972 | Pizzini et al. | 260/465.4 |
| 3,655,553 | 4/1972 | DeWald | 260/859 R |
| 3,953,393 | 4/1976 | Ramlow et al. | 260/31.8 R |

FOREIGN PATENT DOCUMENTS

| 735,010 | 5/1966 | Canada. |
| 785,835 | 5/1968 | Canada. |
| 1,022,434 | 3/1966 | United Kingdom. |

OTHER PUBLICATIONS

Kuryla et al., Polymer Polyols, Journal of Cellular Plastics, Mar. 1966, pp. 1-3.
Schildknecht, Vinyl and Related Polymers, John Wiley, New York (1952) pp. 26, 106 and 107.

Primary Examiner—H.S. Cockeram
Attorney, Agent, or Firm—Eugene C. Trautlein

[57] ABSTRACT

Novel improved polymer/polyol compositions made by polymerizing, in the absence of any alkyl mercaptan, one or more ethylenically unsaturated monomer substantially free of bound halogen in situ in a blend of about 55 to about 95 wt. % of a polyol having a number average molecular weight not greater than about 4000 and from about 45 to about 5 wt. % of a polyol having a number average molecular weight of not less than about 5000 to form a highly stable dispersion of small polymer particles in said blend. The novel compositions are highly useful in the production of polyurethane products.

26 Claims, No Drawings

POLYMER/POLYOL COMPOSITIONS, PROCESSES FOR MAKING SAME AND PROCESSES FOR MAKING POLYURETHANE PRODUCTS THEREFROM

CROSS-REFERENCE TO RELATED APPLICATION

This application is a continuation-in-part of application Ser. No. 699,397, filed June 24, 1976, and now abandoned.

BACKGROUND OF THE INVENTION

1. Field of the Invention

The invention relates to novel polymer/polyol compositions that are reactive with polyisocyanates to produce polyurethane products. The invention also relates to novel methods for making such compositions and to methods for making polyurethane products therefrom.

2. Description of the Prior Art

Polymer/polyol dispersions have been and currently are being used in the production of polyurethane products. Such dispersions result in polyurethane products having a wide variety of desirable properties.

There are a number of prior art disclosures relating to the production of polymer/polyol dispersions including the Stamberger patents, U.S. Pat. Nos. 3,304,273; 3,383,351 and Re. 28,715 (reissue of U.S. Pat. No. 3,383,351); the Stamberger British Pat. No. 1,022,434; the Scharf et al. and Kuryla Canadian Pat. Nos. 735,010 and 785,835; the Pizzini et al. U.S. Pat. No. 3,823,201; the Ramlow et al. U.S. patent application, Ser. No. 431,080, filed Jan. 7, 1974; the Ramlow et al. patent U.S. Pat. No. 3,953,393; and the DeWald U.S. Pat. No. 3,655,553.

Each of these prior art disclosures beginning with the Stamberger patents describes the production of polymer/polyol dispersions by polymerizing one or more ethylenically unsaturated monomers in situ in a polyol to form dispersions of small polymer particles dispersed in the polyol. The dispersions are then mixed with polyisocyanate and other polyurethane-forming reagents and reacted to form the polyurethane product and serve as a convenient, efficient and economical means for improving resultant polyurethane properties. This procedure and the resulting polymer/polyol dispersions have been widely accepted by the polyurethane industry and continue to be extensively used throughout the industry.

While the prior art polymer/polyol dispersions have found extensive use throughout the polyurethance industry, the development of more sophisticated, higher speed and larger volume equipment, machines and systems for handling, mixing and reacting the polyurethane-forming ingredients has created the need for improvements in polymer/polyol dispersions. The need for more stable dispersions has developed so that they can be stored until used without undergoing any significant settling. At one time there was not much concern for the seediness, viscosity or filterability of polymer/polyols in actual commercial practice. However, the state of the art of polyurethane production now has advanced to the point where these considerations are very important. There is now much concern with filterability, seediness, and viscosity because of the more sophisticated machine systems now in use for large volume production. Also, the prior art dispersions could not be made in highly stable condition with the relatively low molecular weight polyols such as dipropylene glycols, thus rendering the lower molecular weight materials less desirable than the higher molecular weight materials as a polyol component of polymer/polyol dispersions. The lower molecular weight polyols are of value in those instances where low viscosity is essential and for foams, coatings and some types of sealants.

The present invention provides highly stable and highly filterable polymer/polyol compositions which are low in, or substantially free of, seediness. It also permits comparatively higher polymer contents in the dispersion at lower viscosities without impairing stability. These and other advantages are obtained by employing in the lower molecular weight polyol a small amount of higher molecular weight polyol.

The use of polyol blends to produce polymer/polyols has been disclosed by the above-identified Stamberger, Scharf et al., Kuryla, Pizzini, Ramlow et al and DeWald patents and the Ramlow et al patent application. The use of low molecular weight polyols in polymer/polyol dispersions is mentioned in the Stamberger British patent. However, nowhere in any of these references is there any disclosure or suggestion of the discovery of the advantages of the present invention by the addition of a small amount of a higher molecular weight polyol to a lower molecular weight polyol as described and claimed herein.

The DeWald patent discloses that the polyol is preferably a triol but can contain as much as 40 percent of a diol or tetrol having the same molecular weight range. The molecular weights of the polyols do not exceed 5500, are preferably no more than 5000 and are advantageously in the range of 1500-5000 and preferably 3000-5000.

The Pizzini patent discloses the use of a polyol blend consisting of two polyols having the same molecular weights. The Ramlow et al patent application discloses the preparation of polymer/polyol dispersions from polyol blends and vinyl or vinylidene halogenide monomers and alleges improvements in stability. The application states that it has been found that stable graft copolymer dispersions derived from vinyl monomers can be prepared at temperatures below 100° C. and in the absence of auxiliary chain transferring agents if the monomer is vinyl chloride, vinyl bromide, vinylidene chloride or vinylidene bromide. The polymer/polyols prepared from halogenated monomers can interfere with the production of polyurethane products and in many cases are unacceptable for such use by forming acidic decomposition products which interfere with the catalyst.

The Ramlow et al. patent discloses the preparation of polymer/polyol dispersions by polymerizing vinyl monomers in the presence of alkyl mercaptans as chain transferring agents in specially formulated, unsaturation-containing polyols containing specified, and ostensibly critical, amounts of unsaturation. Such polymer/polyol dispersions are very limited in their applications in the polyurethane field because of the malodorous qualities of the polyurethane products made therefrom. This malodorous quality results from the alkyl mercaptan chain transfer agent required by the patent disclosure in the manufacture of the polymer/polyol dispersion rendering such products unacceptable to the consumer, especially, in such products as mattresses or arm rests, crash pads etc. The use of alkyl mercaptans as required by this patent also presents excessive processing problems due to the extremely offensive and powerful odor of the mercaptans and their ill effects on the workers producing or using the dispersions.

None of the prior art references mentioned above and no prior art is known which discloses, teaches or suggests stable polymer/polyols having the advantageous properties of the compositions of this invention prepared from ethylenically unsaturated monomers by the use of blends of a large amount of a lower molecular weight polyol and a small amount of a higher molecular weight polyol.

SUMMARY OF THE INVENTION

The present invention provides polymer/polyol compositions that are highly stable and highly filterable. These compositions, in addition to being highly stable, can be highly fluid and substantially free of scrap and seeds. The polymer particles of the compositions of this invention are small in size, in a preferred embodiment less than 30 microns in diameter. Polymer/polyol compositions can be made, according to this invention, with exceptionally low viscosities. They can also be made with relatively high polymer contents. Polymer/polyol compositions of this invention are readily convertible to polyurethane products of exceptional properties, including in certain cases high load bearing capacity and high resistance to discoloration.

The above-mentioned deficiencies of the prior art can be overcome by this invention by the addition of a small amount of a higher molecular weight polyol to the base polyol of a lower molecular weight which is desired to be used in the production of the polymer/polyol compositions. There is no need to employ halogenated monomers which can be harmful in subsequent polyurethane production. Furthermore, there is no need to use such malodorous and offensive materials as alkyl mercaptans.

In its broad aspect, this invention achieves the above-mentioned advantages by providing stable liquid polymer/polyol compositions which are convertible by reaction with polyisocyanates to polyurethane products wherein the polymer/polyol composition is normally liquid at the temperature at which the composition is converted to the polyurethane product and the polymer/polyol composition is formed in situ in the absence of any alkyl mercaptan in the polyol from one or more polymerizable ethylenically unsaturated monomer substantially free of chemically bound halogen. The polymer/polyol compositions of this invention are preferably liquid at 25° C. The invention provides stable dispersions of small particles of the polymer in the polyol by the in situ polymerization of the monomer, or mixture of monomers, in a polyol blend comprising about 55 to about 95 wt.% of a polyol having a number average molecular weight not greater than about 4000 and from about 45 to about 5 wt.% of a polyol having a number average molecular weight of not less than about 5000. Another advantage of this invention is that a wider range of free radical catalyst can be used in the polymerization without critically narrow limitations and without impairing stability or filterability. For example, the azo catalysts as well as peroxide catalysts can be used as desired or required and catalysts can be selected that are safer and easier to use.

The invention also relates to the process for making the above-mentioned compositions and the process for making polyurethane products using same. Polymer/polyol compositions of this invention are convertible by reaction with polyisocyanates to high modulus polyurethane elastomers and foams.

DESCRIPTION OF SPECIFIC EMBODIMENTS

The polymer/polyol compositions of this invention are liquid, stable dispersions of polymer in a polyol blend comprising about 55 to about 95 wt.%, preferably about 70 to about 90 wt.%, of one or more polyols having a number average molecular weight of not greater than 4000, hereinafter also called the lower molecular weight or LMW polyol, and about 5 to 45 wt.%, preferably about 10 to about 30 wt.%, of one or more polyols having a number average molecular weight of not less than about 5000, hereinafter also called the higher molecular weight or HMW polyol, the weight percents being based on the total weight of said LMW and HMW polyols in the composition. There is substantially no lower limit on the molecular weight of the LMW polyol nor upper limit on the molecular weight for the HMW polyol so long as the polyols are liquid and the blend and final polymer/polyol possess the viscosities desired. The molecular weight of the LMW polyol can be as low as that of dipropylene glycol and preferably is in the range of about 400 to about 4000 and most preferably about 1000 to about 4000. The molecular weight of the HMW polyol is preferably about 5000 to about 20000 and most preferably from about 6000 to about 15000. The respective molecular weights are the critical parameters compared to the respective equivalent weights, e.g., no difference has been found between a diol and a triol as the HMW or LMW polyol in obtaining the advantages of this invention if the molecular weights are truly equal. The number average molecular weights of the polyols are used herein and are the theoretical (or apparent) values calculated from theoretical functionality and hydroxyl number. The true number average molecular weights may be somewhat less, depending on how much the true functionality is below the starting or theoretical functionality. Obviously, in order to secure stable dispersions, the LMW polyol and the HMW polyol should be compatible with each other.

The proportion of polymer in the polymer/polyol compositions of this invention can range from about 4 to about 40 wt.%, preferably from about 15 to about 35 wt.%, the percents being based on the total weight of the polymer/polyol composition.

Substantially any of the polyols previously used in the art to make polymer/polyols can be used for the HMW and LMW polyols in this invention provided they meet the number average molecular weight and mutual compatibility requirements set forth above.

Illustrative of the polyols useful in producing polymer/polyol compositions in accordance with this invention are the polyhydroxyalkanes, the polyoxyalkylene polyols, or the like. Among the polyols which can be employed are those selected from one or more of the following classes of compositions, alone or in admixture, known to those skilled in the polyurethane art:

(a) Alkylene oxide adducts of polyhydroxyalkanes;
  (b) Alkylene oxide adducts of non-reducing sugars and sugar derivatives;
  (c) Alkylene oxide adducts of phosphorus and polyphosphorus acids;
  (d) Alkylene oxide adducts of polyphenols;
  (e) The polyols from natural oils such as castor oil, and the like.

Illustrative alkylene oxide adducts of polyhydroxyalkanes include, among others, the alkylene oxide adducts of ethylene glycol, propylene glycol, 1,3-dihydroxypropane, 1,3-dihydroxybutane, 1,4-dihydroxybutane, 1,4-, 1,5- and 1,6-dihydroxyhexane, 1,2-, 1,3-, 1,4-, 1,6-, and 1,8-dihydroxyoctane, 1,10-dihydroxydecane, glycerol, 1,2,4-trihydroxybutane, 1,2,6-trihydroxyhexane, 1,1,1-trimethylolethane, 1,1,1-trimethylolpropane, pentaerythritol, caprolactone, polycaprolactone, xylitol, arabitol, sorbitol, mannitol, and the like. A preferred class of alkylene oxide adducts of polyhydroxyalkanes are the ethylene oxide, propylene oxide, butylene oxide, or mixtures thereof, adducts of trihydroxyalkanes.

A further class of polyols which can be employed are the alkylene oxide adducts of the non-reducing sugars, wherein the alkylene oxides have from 2 to 4 carbon atoms. Among the non-reducing sugars and sugar derivatives contemplated are sucrose, alkyl glycosides such as methyl glucoside, ethyl glucoside, and the like, glycol glycosides such as ethylene glycol glucoside, propylene glycol glucoside, glycerol glucoside, 1,2,6-hexanetriol glucoside, and the like, as well as the alkylene oxide adducts of the alkyl glycosides as set forth in U.S. Pat. No. 3,073,788.

A still further useful class of polyols is the polyphenols, and preferably the alkylene oxide adducts thereof wherein the alkylene oxides have from 2 to 4 carbon atoms. Among the polyphenols which are contemplated are found, for example, bisphenol A, bisphenol F, condensation products of phenol and formaldehyde, the novolac resins; condensation products of various phenolic compounds and acrolein; the simplest member of this class being the 1,1,3-tris(hydroxyphenyl) propanes, condensation products of various phenolic compounds and glyoxal, glutaraldehyde, and other dialdehydes, the simplest members of this class being the 1,1,2,2-tetrakis(hydroxyphenol)ethanes, and the like.

The alkylene oxide adducts of phosphorus and polyphosphorus acids are another useful class of polyols. Ethylene oxide, 1,2-epoxypropane, the epoxybutanes, 3-chloro-1,2-epoxypropane, and the like are preferred alkylene oxides. Phosphoric acid, phosphorous acid, the polyphosphoric acids such as tripolyphosphoric acid, the polymetaphosphoric acids, and the like are desirable for use in this connection.

The polyols employed can have hydroxyl numbers which vary over a wide range. In general, the hydroxyl numbers of the polyols employed in the invention can range from about 20, and lower, to about 850, and higher. The hydroxyl number is defined as the number of milligrams of potassium hydroxide required for the complete hydrolysis of the fully acetylated derivative prepared from 1 gram of polyols. The hydroxyl number can also be defined by the equation:

$$OH = (56.1 \times 1000 \times f)/m.w$$

where
OH = hydroxyl number of the polyol
$f$ = functionality, that is, average number of hydroxyl groups per molecule of polyol
m.w. = molecular weight of the polyol The exact polyol employed depends upon the end-use of the polyurethane product to be produced. The molecular weight or the hydroxyl number is selected properly to result in flexible or semi-flexible foams or elastomers when the polymer/polyol produced from the polyol is converted to a polyurethane. The polyols preferably possess a hydroxyl number of from about 50 to about 150 for semi-flexible foams and from about 30 to about 70 for flexible foams. Such limits are not intended to be restrictive, but are merely illustrative of the large number of possible combinations of the above polyol coreactants.

The most preferred polyols employed in this invention include the poly(oxypropylene) glycols, triols and higher functionality polyols. These polyols also include poly(oxypropylene-oxyethylene) polyols; however, desirably, the oxyethylene content should comprise less than 80 percent of the total and preferably less than 60 percent. The ethylene oxide when used can be incorporated in any fashion along the polymer chain. Stated another way, the ethylene oxide can be incorporated either in internal blocks, as terminal blocks, or may be randomly distributed along the polymer chain. As is well known in the art, the polyols that are most preferred herein contain varying small amounts of unsaturation. As taught by Stamberger, unsaturation in itself does not affect in any adverse way the formation of the polymer/polyols in accordance with the present invention except in the case where the extent or type of unsaturation is so high or effective as to result in a crosslinked polymer.

The polymerizable ethylenically unsaturated monomers which can be used in this invention include those that are free of bound halogen. Monomers of this type include the polymerizable ethylenically unsaturated hydrocarbon monomers and polymerizable ethylenically unsaturated organic monomers the molecules of which are composed of carbon, hydrogen and at least one of O, S, or N. The monomers useful in the process of this invention are the polymerizable monomers characterized by the presence therein of at least one polymerizable ethylenic unsaturated group of the type C = C. The monomers can be used singly or in combination to produce homopolymer/polyol or copolymer/polyol reactive compositions.

These monomers are well known in the art and include the hydrocarbon monomers such as butadiene, isoprene, 1,4-pentadiene, 1,6-hexadiene, 1,7-octadiene, styrene, alpha - methylstyrene, methylstyrene, 2,4-dimethylstyrene, ethylstyrene, isopropylstyrene, butylstyrene, phenylstyrene, cyclohexylstyrene, benzylstyrene, and the like, substituted styrenes such as cyanostyrene, nitrostyrene. N,N-dimethylaminostyrene, acetoxystyrene, methyl 4-vinylbenzoate, phenoxystyrene, p-vinyl diphenyl sulfide, p-vinylphenyl phenyl oxide, and the like; the acrylic and substituted acrylic monomers such as acrylic acid, methacrylic acid, methyl acrylate, 2-hydroxyethyl acrylate, 2-hydroxyethyl methacrylate, methyl methacrylate, cyclohexyl methacrylate, benzyl methacrylate, isopropyl methacrylate, octyl methacrylate, methacrylonitrile, ethyl alpha-ethoxyacrylate, methyl alpha-acetaminoacrylate, butyl acrylate, 2-ethylhexyl acrylate, phenyl acrylate, phenyl methacrylate, N,N-dimethylacrylamide, N,N-dibenzylacrylamide, N-butylacrylamide, methacrylyl formamide, and the like; the vinyl esters, vinyl ethers, vinyl ketones, etc. such as vinyl acetate, vinyl alcohol, vinyl butyrate, isopropenyl acetate, vinyl formate, vinyl acrylate, vinyl methacrylate, vinyl methoxy acetate, vinyl benzoate, vinyl toluene, vinyl naphthalene, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2- pyran, 2-butoxy-2'-vinyloxy diethyl ether, vinyl 2-ethylmercaptoethyl ether, vinyl methyl ketone, vinyl ethyl ketone, vinyl phenul ketone, vinyl ethyl sulfide, vinyl ethyl sulfone, N-methyl-N-vinyl acetamide, N-vinylpyrrolidone, vinyl imidazole, divinyl sulfide, divinyl sulfoxide, divinyl sulfone, sodium vinyl sulfonate, methyl vinyl sulfonate, N-vinyl pyrrole, and the like; dimethyl fumarate, dimethyl maleate, maleic acid, crotonic acid, fumaric acid, itaconic acid, monomethyl itaconate, t-butylaminoethyl methacrylate, dimethylaminoethyl methacrylate, glycidyl acrylate, allyl alcohol, glycol monoesters of itaconic acid, vinyl pyridine, and the like. Any of the known polymerizable monomers can be used and the compounds listed above are illustrative and not restrictive of the monomers suitable for use in this invention. Any of the known chain transfer agents other than alkyl mercaptans can be present if desired.

The preferred monomer used to make the polymer of the polymer/polyol compositions of this invention is acrylonitrile alone as a homopolymer or in combination with styrene as a copolymer. The relative weight proportions of acrylonitrile to styrene illustratively range from about 20:80 to about 100:0, preferably from about 25:75 to 100:0 and more preferably, when low molecular weight polyols, e.g., below about 200 are used, then then the weight ratio should be from about 60:40 to about 85:15. Copolymers of acrylonitrile, methyl methacrylate, and styrene have also been employed.

Catalysts useful in producing the polymer/polyol compositions of this invention are the free radical type of vinyl polymerization catalysts such as the peroxides, persulfates, perborates, percarbonates and the azo compounds or any other suitable catalyst specified in the above-mentioned patents and application. Illustrative of a few such catalysts are 2,2'-azo-bis-isobutyronitrile, dibenzoyl peroxide, lauroyl peroxide, di-t-butyl peroxide, diisopropyl peroxide carbonate, t-butyl peroxy-2-ethylhexanoate, t-butylperpivalate, 2,5-dimethyl-hexane-2,5-di-per-2-ethyl hexoate, t-butylperneodecanoate, t-butylperbenzoate, t-butyl percrotonate, t-butyl perisobutyrate, di-t-butyl perphthalate and the like. Azobis(isobutylronitrile) is the preferred catalyst since it does not impart any objectionable product odor or require special handling in the plant because of possible hazards.

The catalyst concentration is not critical and can be varied within wide limits. As a representative range, the concentration can vary from about 0.1 to about 5.0 weight percent, based upon the total feed to the reactor. Up to a certain point, increases in the catalyst concentration result in increased monomer conversion but further increases do not substantially increase conversion. On the other hand, increasing catalyst concentration increasingly improves product stability. The catalyst concentration selected will usually be an optimum value considering all factors, including costs.

The polymerization can also be carried out with an inert organic solvent present that does not dissolve the polymer. Illustrative thereof are toluene, benzene, and the like, including those known in the art as being suitable solvents for the polymerization of vinyl monomers. The only requirement in the selection of the solvent and the polyol is that they do not interfere with the monomer's polymerization reaction. When an inert organic solvent is used, it is generally removed from the reaction mixture by conventional means before the polymer/polyols is used to produce polyurethane foams.

The temperature range is not critical and may vary from about 80° C. or less to about 150° C. or perhaps greater, the preferred range being from 105° C. to 135° C. The catalyst and temperature should be selected so that the catalyst has a reasonable rate of decomposition with respect to the hold-up time in the reactor for a continuous flow reactor or the feed time for a semi-batch reactor.

The preferred process used in producing the polymer/polyol compositions of this invention involves polymerizing the monomers in the polyol while maintaining a low monomer to polyol ratio throughout the reaction mixture during the polymerization. This provides in the preferred case a polymer/polyol composition in which essentially all of the polymer particles have diameters of less than thirty microns and generally less than one micron. Such low ratios are achieved by employing process conditions that provide rapid conversion of monomer to polymer. In practice, a low monomer to polyol ratio is maintained, in the case of semi-batch and continuous operation, by control of the temperature and mixing conditions and, in the case of semi-batch operation, also by slowly adding the monomers to the polyol. The process can be carried out in various manners such as by a semibatch reaction, a continuous back-mixed stirred tank reactor, etc. For the latter, a second stage may be used to incrementally increase the conversions of monomers. The mixing conditions employed are those attained using a back-mixed reactor (e.g., a stirred flask or stirred autoclave). Such reactors keep the reaction mixture relatively homogeneous and so prevent localized high monomer to polyol ratios such as occur in certain tubular reactors (e.g., in the first stages of "Marco" reactors when such reactors are operated conventionally with all the monomer added to the first stage).

When using a semi-batch process, the feed times can be varied (as well as the proportion of polyol in the reactor at the start versus polyol fed with the monomer) to effect changes in the product viscosity. Generally, longer feed times result in higher product viscosities and may allow use of slightly broader acrylonitrile to styrene ranges for a given polyol and polymer content.

The crude polymer/polyol compositions usually contain small amounts of unreacted monomers. Such residual monomers can be converted to additional polymer by employing a two-stage operation in which the product of the first stage (the back-mixed reactor) is passed into a second stage which can be a Marco reactor operated conventionally or an unstirred tank reactor.

The preferred temperature used in producing polymer/polyol compositions in accordance with this invention is any temperature at which the half life of the catalyst is no longer than about 25 percent of the residence time in the reactor. As an illustration the half life of the catalyst at a given reaction temperature may be no longer than six minutes (preferably no longer than from 1.5 to 2 minutes). The half lives of the catalysts become shorter as the temperature is raised. By way of illustration, azo-bisisobutyronitrile has a half life of 6 minutes at 100° C. The maximum temperature used is not narrowly critical but should be lower than the temperature at which significant decomposition of the reactants or product occurs.

In the process used to produce the polymer/polyols of this invention, the monomers are polymerized in the polyol. Usually, the monomers are soluble in the polyol. It has been found that first dissolving the monomers in a minor portion of the polyol and adding the solution so formed to the remainder of the polyol at reaction temperature facilitates mixing the monomers and the polyol and can reduce or eliminate reactor fouling. When the monomers are not soluble in the polyols, known techniques (e.g., dissolution of the insoluble monomers in another solvent) can be used to disperse the monomers in the polyol prior to polymerization. The conversion of the monomers to polymers achieved by this process is remarkably high, (e.g., conversions of at least 72 to 95% of the monomers are generally achieved).

In the case of copolymerizing acrylonitrile and styrene the ratio of acrylonitrile to styrene in the polymer is always slightly lower than the ratio of acrylonitrile to styrene monomer in the feed because the styrene tends to react slightly faster than the acrylonitrile. For example, if acrylonitrile and styrene monomers were fed at a weight ratio of 80:20, the resulting polymer would have an acrylonitrile to styrene weight ratio of about 79:21 or 78:22.

The process of this invention produces polymer/polyol compositions which are highly stable and further characterized by relatively high polymer contents, small polymer particle size, freedom from scrap and seeds and convertibility to highly useful polyurethane elastomers and foams. More particularly, with a given polyol, the present invention allows the ratio of styrene to acrylonitrile, or the polymer content, to be increased, yet still providing products of improved stability. Also, more stable polymer/polyols may be made with lower molecular weight polyols than can be accomplished by prior processes. The polymer/polyol compositions of this invention are stable dispersions such that essentially all of the polymer particles remain suspended on standing over periods of several months without showing any significant settling.

The polymer/polyols of the present invention comprise dispersions in which the polymer particles (the same being either individual particles or agglomerates of individual particles) are relatively small in size and, in the preferred embodiment are all essentially less than 30 microns. Thus, in the preferred embodiment, essentially all of the product (viz. - about 99 percent or more) will pass through the filter employed in the filtration test that will be described in conjunction with the Examples. This insures that the polymer/polyol products can be successfully processed in all types of the relatively sophisticated machine systems now in use for large volume production of polyurethane products, including those employing impingement-type mixing which necessitate the use of filters that cannot tolerate any significant amount of relatively large particles. Less rigorous applications are satisfied when about 50 percent of the product passes through the filter. Some applications may also find useful products in which only about 20 percent passes through. Accordingly, the polymer/polyols of the present invention contemplate products in which at least 20 percent pass through the filter, preferably at least 50 percent, and most preferably essentially all.

What has been discovered in this invention are polymer/polyol dispersions of higher than normal polymer contents in glycols or other very low molecular weight polyols, which still have commercially acceptable properties of low scrap and low filterable solids and no settling tendency. Polymer/polyols are normally stable dispersions of insoluble polymers (e.g., acrylonitrile polymers or acrylonitrile/styrene copolymers or any other monomer system) in a base polyol. It is also known that the base polyol molecular weight appears to have a substantial effect on the dispersion stability of the polymer/polyol. Generally, the higher the molecular weight of the base polyol, the better is the dispersion stability. Therefore, the production of stable polymer polyols in low molecular weight polyols heretofore has been difficult. In accordance with the present invention, adding a small amount (5-45 percent) of a high molecular weight (5000 or more) polyol to a low molecular weight polyol results in improved dispersion stability.

The effectiveness of a high molecular weight polyol to improve dispersion stability of a polymer/polyol depends upon (1) the molecular weight and (2) its concentration in the polyol blend. The higher the molecular weight, the more the improvement in dispersion stability that is realized for the same amount of addition. Similarly, the higher the amount of a high molecular weight polyol used, the more the improvement in dispersion stability that is achieved. Significant improvement in dispersion stability is achieved by adding as little as 5 to 45 percent by weight of a high molecular weight polyol. However, when selecting the amount and type of a high molecular weight polyol, other factors such as effects on foaming characteristics and foam properties should also be taken into consideration.

The polymer concentration of the polymer/polyol compositions of this invention can be adjusted by the addition of additional polyol to provide the polymer concentration suitable for the desired end use. In this manner, the polymer/polyol compositions can be produced at polymer concentrations of, for example, 20% and reduced polymer concentrations as low as 4% by the addition of more polyol or, alternatively, the composition can be made directly with a polymer concentration of 4% by the method of this invention.

The present invention also provides novel polyurethane products made with the novel polymer/polyol compositions and novel methods for producing such products. The novel polyurethane products are prepared by reacting (a) a polymer/polyol composition of this invention, (b) an organic polyisocyanate, and (c) a catalyst for the reaction of (a) and (b) to produce the polyurethane product, and, when a foam is being prepared, a blowing agent and usually a foam stabilizer. The reaction and foaming operations can be performed in any suitable manner, preferably by the one-shot technique, although the prepolymer technique can be used if desired.

The organic polyisocyanates that are useful in producing polyurethane products in accordance with this invention are organic compounds that contain at least two isocyanate groups. Such compounds are well known in the art. Suitable organic polyisocyanates include the hydrocarbon diisocyanates, (e.g., the alkylene diisocyanates and the arylene diisocyanates) as well as known triisocyanates. As examples of suitable polyisocyanates one can mention, 1,2-diisocyanatoethane, 1,3-diisocyanatopropane, 1,2-diisocyanatopropane, 1,4-diisocyanatobutane, 1,5-diisocyanatopentane, 1,6-diisocyanatohexane, bis(3-isocyanatopropyl) ether, bis(3-isocyanatopropyl)sulfide, 1,7-diisocyanatoheptane, 1,5-diisocyanato-2,2-dimethylpentane, 1,6-diisocyanato-3-methoxyhexane, 1,8-diisocyanatooctane, 1,5-diisocyanato-2,2,4-trimethylpentane, 1,9-diisocyanatononane, 1,10-diisocyanatopropyl ether of 1,4-butylene glycol, 1,11-diisocyanatoundecane, 1,12-diisocyanatododecane bis(isocyanatohexyl)sulfide, 1,4- diisocyanatobenzene, 2,4-diisocyanatotoluene, 2,6-diisocyanatotolylene, 1,3-diisocyanato-o-xylene, 1,3-diisocyanato-m-xylene, 1,3-diisocyanato-p-xylene, 2,4-diisocyanato-1-chlorobenzene, 2,4-diisocyanato-1-nitrobenzene, and 2,5-diisocyanato-1-nitrobenzene, 4,4'-diphenylmethylene diisocyanate, 3,3'-diphenylmethylene diisocyanate, and polymethylene poly(phenyleneisocyanates) having the formula:

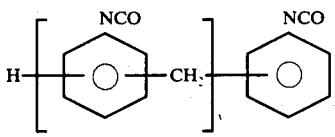

wherein x has an average value from 1.1 to 5 inclusive (preferably from 2.0 to 3.0), and mixtures thereof.

The catalysts that are useful in producing polyurethanes in accordance with this invention include: (a) tertiary amines such as bis(dimethylaminoethyl)ether, trimethylamine, triethylamine, N-methylmorpholine, N-ethylmorpholine, N,N-dimethylbenzylamine, N,N-dimethylethanolamine, N,N,N',N'-tetramethyl-1,3-butanediamine, triethylanolamine, 1,4-diazabicyclo[2.2.2] octane, pyridine oxide and the like; (b) tertiary phosphines such as trialkylphosphines, dialkylbenzylphosphines, and the like; (c) strong bases such as alkali ena alkaline earth metal hydroxides, alkoxides, and phenoxides; (d) acidic metal salts of strong acids such as ferric chloride, stannic chloride, stannous chloride, antimony trichloride, bismuth nitrate and chloride, and the like; (e) chelates of various metals such as those which can be obtained from acetylacetone, benzoylacetone, trifluoroacetylacetone, ethyl acetoacetate, salicylaldehyde, cyclopentanone-2-carboxylate, acetylacetoneimine, bis-acetylacetonealkylenediimines, salicylaldehydeimine, and the like, with the various metals such as Be, Mg, Zn, Cd, Pb, Ti, Zr, Sn, As, Bi, Cr, Mo, Mn, Fe, Co, Ni, or such ions as $MoO_2^{++}$, $UO_2^{++}$, and the like; (f) alcoholates and phenolates of various metals such as $Ti(OR)_4$, $Sn(OR)_4$, $Sn(OR)_2$, $Al(OR)_3$, and the like, wherein R is alkyl or aryl, and the reaction products of alcoholates with carboxylic acids, betadiketones, and 2-(N,N-dialkylamino)alkanols, such as the well known chelates of titanium obtained by said or equivalent procedures; (g) salts of organic acids with a variety of metals such as alkali metals, alkaline earth metals, Al, Sn, Pb, Mn, Co, Ni, and Cu, including, for example, sodium acetate, potassium laurate, calcium hexanoate, stannous acetate, stannous octoate, stannous oleate, lead octoate, metallic driers such as manganese and cobalt naphthenate, and the like; (h) organometallic derivatives of tetravalent tin, trivalent and pentavalent As, Sb, and Bi, and metal carbonyls of iron and cobalt.

Among the organotin compounds that deserve particular mention are dialkyltin salts of carboxylic acids, e.g., dibutyltin diacetate, dibutyltin dilaurate, dibutyltin maleate, dilauryltin diacetate, dioctyltin diacetate, dibutyltin-bis(4-methylaminobenzoate), dibutyltin-bis(6-methylaminocaproate), and the like. Similarly there may be used a trialkyltin hydroxide, dialkyltin oxide, dialkyltin dialkoxide, or dialkyltin dichloride. Examples of these compounds include trimethyltin hydroxide, tributyltin hydroxide, trioctyltin hydroxide, dibutyltin oxide, dioctyltin oxide, dilauryltin oxide, dibutyltinbis(isopropoxide), dibutyltinbis(2-dimethylaminopentylate), dibutyltin dichloride, dioctyltin dichloride, and the like.

The tertiary amines may be used as primary catalysts for accelerating the reactive hydrogen/isocyanate reaction or as secondary catalysts in combination with one or more of the above noted metal catalysts. Metal catalysts, or combinations of metal catalysts, may also be employed as the accelerating agents, without the use of amines. The catalysts are employed in small amounts, for example, from about 0.001 percent to about 5 percent, based on weight of the reaction mixture.

When the product being formed is a polyurethane foam, this may be accomplished by employing a small amount of a polyurethane blowing agent, such as water, in the reaction mixture (for example, from about 0.5 to about 5 weight percent of water, based upon total weight of the polymer/polyol composition), or through the use of blowing agents which are vaporized by the exotherm of the reaction, or by a combination of the two methods. Illustrative polyurethane blowing agents include halogenated hydrocarbons such as trichloromonofluoromethane, dichlorodifluoromethane, dichloromonofluoromethane, dichloromethane, trichloromethane, 1,1-dichloro-1-fluoroethane, 1,1,2-trichloro-1,2,2-trifluoromethane, hexafluorocyclobutane, octafluorocyclobutane, and the like. Another class of blowing agents include thermally unstable compounds which liberate gases upon heating, such as N,N'-dimethyl-N,N'-dinitrosoterephthalamide, and the like. The generally preferred method of foaming for producing flexible foams is the use of water or a combination of water plus a fluorocarbon blowing agent such as trichloromonofluoromethane. The quantity of blowing agent employed will vary with factors such as the density desired in the foamed product.

It is also within the scope of the invention to employ small amounts, e.g., about 0.001 percent to 5.0 percent by weight, based on the total reaction mixture, of a foam stabilizer such as a "hydrolyzable" polysiloxanepolyoxyalkylene block copolymer such as the block copolymers described in U.S. Pat. Nos. 2,834,748 and 2,917,480. Another useful class of foam stabilizers are the "non-hydrolyzable" polysiloxane-polyoxyalkylene block copolymers such as the block copolymers described in U.S. Pat. No. 3,505,377; U.S. patent application No. 888,067, filed Dec. 24, 1969 and British patent specification No. 1,220,471. The latter class of copolymers differs from the above-mentioned polysiloxane-polyoxyalkylene block copolymers in that the polysiloxane moiety is bonded to the polyoxyalkylene moiety through direct carbon-to-silicone bonds, rather than through carbon-to-oxygen-to-silicone bonds. These various polysiloxane-polyoxyalkylene block copolymers preferably contain from 5 to 50 weight percent of polysiloxane polymer with the remainder being polyoxyalkylene polymer.

The polyurethanes produced in accordance with this invention may be advantageously employed in various applications. For example, the present invention allows the production of polyurethane foams. Such foams may be desirably employed in the slab foam market. Still further, the polymer/polyols of this invention may be used to form polyurethane elastomers in which relatively low molecular weight polyols must be used to provide the requisite stiffness. Also, polymer/polyols pursuant to this invention may be employed to form polyurethane products for applications where high load-bearing characteristics are required. Polyurethanes produced according to this invention are useful in the applications in which conventional polyurethanes are employed such as in the manufacture of arm rests, crash pads, mattresses and automobile bumpers.

The following examples are presented. The following designations used in the examples and elsewhere herein have the following meanings:

"A/MMA/S" denotes the weight ratio of acrylonitrile to methyl methacrylate to styrene.
"A/S" or "A:S" denotes the weight ratio of acrylonitrile to styrene.
"Calc" denotes calculated.
"cps" denotes centipoises.
"gm" denotes grams.
"hr" denotes hour.
"Parts" denotes parts by weight.
"Poly A" denotes polyacrylonitrile.
"Poly S" denotes polystyrene.
"ppm" denotes parts by weight per million parts by weight.
"psig" denotes pounds per square inch gauge pressure. Temperatures are given in +C. unless otherwise stated.
"pli" denotes pounds per linear inch.
"Residuals" denotes unreacted monomers.
"RPM" denotes revolutions per minute.
"TDI" a mixture of 80% 2,4-tolylene diisocyanate and 20% 2,6-tolylene diisocyanate.
"TMSN" is tetramethylsuccinonitrile (a decomposition product of VAZO-64)
"wt-%" denotes percent by weight.
"VAZO-64" or "VAZO" denotes 2,2'-azo-bis-isobutyronitrile. Ratios are based on weight.
"%" denotes percentage by weight unless otherwise stated.
TBPO denotes t-butyl per-2-ethylhexoate. Numbered Examples illustrate this invention. Lettered Examples are comparative Examples and do not illustrate the invention.

Lettered polyols are the lower molecular weight polyols and numbered polyols are the higher molecular weight polyols.

"L.M.W." denotes lower molecular weight.
"H.M.W." denotes higher molecular weight. Polyol ratios are on a weight polyol first and the % of the high molecular weight polyol second.

Calculated hydroxyl numbers given in the Tables of Examples were based on calculated total polymer content and hydroxyl number of base polyol.

The light transmission data was obtained by using light of 500 millimicron wave lengths and the polymer/polyol was in a 0.01% dilution in a clear solvent.

Polyol I Polypropylene oxide-polyethylene oxide polyol made from propylene oxide and ethylene oxide and an 80/20 blend by weight of sorbitol and glycerine, having a theoretical number average molecular weight of about 10800 and a hydroxyl number of about 28. The alkylene oxide units are present primarily in blocks, and the end units are substantially all ethylene oxide units, i.e., the ethylene oxide is used to "cap" the polyol. The polyol contains about 8 wt.% ethylene oxide units based on the total polyol weight.

Polyol II Polypropylene oxide triol made from propylene oxide and glycerine and having a theoretical number average molecular weight of about 6000 and a hydroxyl number of about 28.7.

Polyol III Polypropylene oxide-polyethyene oxide triol made from propylene and ethylene oxides and glycerine and having a theoretical number average molecular weight of about 6000 and a hydroxyl number of about 26.1. The alkylene oxide units are present primarily in blocks and the end units are substantially all ethylene oxide units, i.e., the ethylene oxide is used to "cap" the triol. Based on its total weight, this triol contains about 14 wt.% $C_2H_4O$.

Polyol A Tripropylene glycol.

Polyol B Dipropylene glycol.

Polyols C through F Polypropylene oxide diols made from propylene oxide and dipropylene glycol and having the theoretical number average molecular weights and hydroxyl numbers correspondingly listed below:

| Polyol | M.W. | OH No. |
|--------|------|--------|
| C | 400 | 254 |
| D | 700 | 150.5 |
| E | 1000 | 112.1 |
| F | 2000 | 55.95 |

Polyol G Polypropylene oxide triol made from propylene oxide and glycerine and having a theoretical number average molecular weight of about 3000 and a hydroxyl number of about 55.4.

Polyol H Polypropylene oxide-polyethylene oxide triol made from propylene oxide, ethylene oxide and glycerine and having a theoretical number average molecular weight of about 3000 and a hydroxyl number of 56.4. Substantially all the ethylene oxide units are disposed internally, i.e., substantially none of them form end units. Based on its total weight, this polyol contains about 8 wt.% $C_2H_4O$.

Polyol J Polypropylene oxide-polyethylene oxide triol made from propylene oxide, ethylene oxide and glycerine and having a theoretical number average molecular weight of about 3600 and a hydroxyl number of about 46.7. Substantially all of the ethylene oxide units are disposed internally, i.e., substantially none of them form end units. Based on its total weight, the polyol contains about 14 wt.% $C_2H_4O$.

Polyol K Polypropylene oxide-polyethylene oxide triol made from propylene oxide, ethylene oxide and glycerine and having a theoretical number average molecular weight of about 2700 and a hydroxyl number of about 62.14. Substantially all of the ethylene oxide units are disposed internally and, based upon its total weight, the polyol contains about 8 wt.% $C_2H_4O$.

Polyol L Polypropylene oxide-polyethylene oxide triol made from propylene oxide, ethylene oxide and glycerine and having a theoretical number average molecular weight of about 3400 and a hydroxyl number of about 49. Substantially all of the ethylene oxide units are disposed internally as sequential blocks and, based upon its total weight, the polyol contains 10 wt.% $C_2H_4O$.

FILTERABILITY

The preferred compositions of this invention are essentially free of polymer particles having diameters over 30 microns. A composition meets this criteria if over 99 wt.% of the composition passes successively through a 150-mesh screen and a 700 mesh screen in the following test. A 470 gram sample of the composition being tested is diluted with 940 grams of anhydrous isopropanol to reduce viscosity effects. The diluted sample is passed through a 2.4 square inch 150 mesh screen and then through a 2.4 square inch 700 mesh screen. (The screens are cleaned, dried and weighed before the test.) Then the screens are washed with isopropanol to remove any polyol, dried and weighed. The difference between the final and initial screen weights corresponds to the amount of polymer that did not pass through the screens. The 150-mesh screen has a square mesh with average mesh opening of 105 microns and it is a "Standard Tyler" 150 square mesh screen. The 700-mesh screen is made with a Dutch twill weave having average mesh openings of 30 microns and is described in Bulletin 46267-R of the Ronningen-Petter Company of Kalamazoo, Mich.

CENTRIFUGABLE SOLIDS

The polymer/polyol composition is centrifuged for about 24 hours at about 3000 revolutions per minute and 1470 radial centrifugal "g" force. Then the centrifuge tube is inverted and allowed to drain for four hours. The non-flowing cake remaining at the bottom of the tube is reported as wt.% of the initial weight of the composition tested.

CLEAR LAYER BEFORE TIPPING

The polymer/polyol composition is placed in a small test tube and centrifuged for about 24 hours after which time the liquid in the test tube is observed and the height of the clear layer on the top is measured. This height is given as a percentage of the height of the liquid in the test tube.

EXAMPLES 1-37 AND A-F

Examples 1 through 37 and A through F were conducted continuously in a 550 cubic centimeter continuously stirred tank reactor fitted with baffles and an impeller generally run at 800 rpm. The feed components were pumped to the reactor continuously after going through an inline mixer to assure complete mixing of the feed components before entering the reactor. The internal temperature of the reactor was controlled to within one degree Centigrade by applying controlled heating or cooling to the outside of the reactor. The product from the reactor flowed out through a back pressure regulator. (The regulator was adjusted to give 10 pounds per square inch gauge back pressure in the reactor.) Then the product flowed through a water cooled tubular heat exchanger to a product receiver. Portions of the crude product were vacuum stripped at 2 millimeters pressure and 120° to 130° C. for testing. Conversions were determined from gas chromatic analysis of the amount of unreacted monomers present in the crude product before stripping.

The experimental conditions and results of Examples 1-37 and A-F are tabulated in Tables I-VII below.

TABLE I

| Example | 1 | 2 |
|---|---|---|
| Polyol Blend | A/I | B/I |
| Ratio of L.M.W. to H.M.W. Polyols | 80/20 | 80/20 |
| Reaction, ° C. | 125 | 123 |
| Residence Time, min. | 12 | 12 |
| VAZO in feed, wt.% | 0.5 | 0.5 |
| Monomer + VAZO in feed, wt.% | 20.08 | 20.35 |
| A/S in feed | 78/22 | 78/22 |
| Polyol Feed Rate, gm/hr | 2284 | 2246 |
| Monomer + VAZO Feed Rate, gm/hr | 574 | 574 |
| Product Weight, gm/hr | 2842 | 2808 |
| Material Balance, % | 99.44 | 99.57 |
| Residual Acrylonitrile, % | 4.82 | 5.06 |
| Styrene, % | 0.33 | 0.30 |
| TMSN, % | 0.17 | 0.15 |
| Conversions, Acrylonitrile, % | 68.64 | 67.47 |
| Styrene, % | 92.39 | 93.16 |
| Combined, % | 73.86 | 73.12 |
| Poly A in Product by Calc., wt.% | 11.06 | 11.04 |
| Poly S in Product by Calc., wt.% | 4.20 | 4.30 |
| Polymer in Product by Calc., wt.% | 15.26 | 15.34 |
| Product Properties | | |
| Viscosity (Brookkfield) at 25° C., cps | 257 | 400 |
| Calculated Hydroxyl No., mg KOH/gm | 400.65 | 571.33 |
| Light Transmission, % | 62.5 | 57.5 |
| Filtration Hindrance | | |
| 150 Mesh Screen, % through | 100 | 100 |
| solids on screen, ppm | 1 | 5 |
| 700 Mesh Screen, time, sec. | 112 | 146 |
| % through | 100 | 100 |
| solids on screen, ppm | 6 | 6 |
| Centrifugible Solids, stripped, wt. % | 11.14 | 13.78 |
| Clear Layer before Tipping, % | 6 | 6 |

Acrylonitrile and styrene in a weight ratio of 78/22 were added with VAZO to an 80/20 (weight) mixture of 1,4-butane diol and Polyol I. In the feed, the VAZO concentration was 0.5 wt.%, and the monomer plus VAZO content was 20.07 wt.%. The feed rate of the polyol mixture was 2270 gm/hr. and that of the monomer and VAZO was 570 gm/hr. Product was obtained at the rate of 2836 gm/hr. and the material balance was 99.86%. This product, however, layered out overnight illustrating the effects of the incompatibility of the polyols.

TABLE II

| Example | 3 | 4 | 5 | 6 | 7 | 8 | 9 | 10 | 11 | 12 | 13 | 14 |
|---|---|---|---|---|---|---|---|---|---|---|---|---|
| Polyol Blend | C/I | C/I | D/I | D/I | D/I | D/I | E/I | E/I | E/I | F/I | F/I | F/I |
| Ratio of L.M.W. to H.M.W. Polyols | 80/20 | 90/10 | 68/32 | 75/25 | 80/20 | 90/10 | 80/20 | 80/20 | 80/20 | 80/20 | → | → |
| Reaction, ° C | 125 | 125 | → | → | → | → | 120 | 120 | 120 | 120 | 120 | 120 |
| Residence Time, min. | 12 | 12 | → | → | → | → | → | → | → | → | → | → |
| VAZO in feed, wt. % | 0.5 | 0.5 | 0.5 | 0.5 | 0.5 | 0.5 | 0.4 | 0.46 | 0.53 | 0.4 | 0.4 | 0.4 |
| Monomer + VAZO in feed, wt. % | 20.34 | 20.08 | 20.67 | 20.6 | 20.49 | 20.20 | 19.57 | 23.34 | 27.13 | 16.96 | 20.24 | 20.45 |
| A/S in feed | 78/22 | → | → | → | → | → | → | → | → | 50/50 | 50/50 | 40/60 |
| Polyol Feed Rate, gm/hr | 2256 | 2292 | 2218 | 2232 | 2238 | 2276 | 2236 | 2128 | 2036 | 2272 | 2199 | 2194 |
| Monomer + VAZO Feed Rate/gm/hr | 576 | 576 | 578 | 579 | 577 | 576 | 544 | 648 | 758 | 464 | 558 | 564 |
| Product Weight, gm/hr | 2820 | 2860 | 2789 | 2811 | 2802 | 2840 | 2752 | 2744 | 2778 | 2724 | 2739 | 2748 |
| Material Balance, % | 99.58 | 99.72 | 99.75 | 100.0 | 99.52 | 99.58 | 98.99 | 98.85 | 99.43 | 99.56 | 99.35 | 99.63 |
| Residual Acrylonitrile, % | 3.14 | 3.07 | 2.36 | 2.53 | 2.58 | 2.64 | 2.60 | 2.54 | 2.47 | 1.53 | 1.74 | 1.45 |

TABLE II-continued

| Example | 3 | 4 | 5 | 6 | 7 | 8 | 9 | 10 | 11 | 12 | 13 | 14 |
|---|---|---|---|---|---|---|---|---|---|---|---|---|
| Styrene, % | 0.40 | 0.35 | 0.39 | 0.36 | 0.41 | 0.38 | 0.43 | 0.42 | 0.41 | 1.10 | 1.14 | 1.86 |
| TMSN, % | 0.19 | 0.16 | 0.21 | 0.20 | 0.20 | 0.19 | 0.14 | 0.16 | 0.18 | 0.18 | 0.18 | 0.23 |
| Conversions, | | | | | | | | | | | | |
| Acrylonitrile, % | 79.8 | 79.97 | 85.03 | 83.86 | 83.54 | 82.89 | 82.8 | 85.93 | 88.16 | 81.59 | 82.57 | 81.98 |
| Styrene, % | 90.88 | 91.90 | 91.23 | 91.86 | 90.72 | 91.27 | 89.92 | 91.76 | 93.03 | 86.77 | 88.58 | 84.59 |
| Combined, % | 82.23 | 82.59 | 86.40 | 85.62 | 85.12 | 84.74 | 84.37 | 87.21 | 89.23 | 84.18 | 85.58 | 83.55 |
| Poly A in Product by Calc., wt.% | 12.81 | 12.66 | 13.76 | 13.54 | 13.44 | 13.14 | 12.78 | 15.81 | 18.84 | 6.94 | 8.44 | 6.80 |
| Poly S in Product by Calc., wt.% | 4.11 | 4.10 | 4.16 | 4.18 | 4.11 | 4.08 | 3.91 | 4.76 | 5.60 | 7.37 | 9.05 | 10.53 |
| Polymer in Product by Calc., wt.% | 16.92 | 16.76 | 17.92 | 17.72 | 17.55 | 17.22 | 16.69 | 20.57 | 24.44 | 14.31 | 17.49 | 17.33 |
| Product Properties Viscosity (Brookfield) at 25° C, cps | 280 | 207 | 620 | 512 | 413 | 330 | 476 | 588 | 652 | 772 | 844 | 852 |
| Calculated Hydroxyl No., mg KOH/gm | 173.73 | 192.75 | 91.76 | 98.95 | 104.14 | 114.57 | 79.64 | 75.93 | 72.23 | 43.42 | 41.80 | 41.99 |
| Light Transmission, % | 63.3 | 58.5 | 70.0 | 69.8 | 66.0 | 58.70 | 63.8 | 62.3 | 61.0 | 47.0 | 46.2 | 41.8 |
| Filtration Hindrance 150 Mesh Screen, % through | 100 | 100 | 100 | 100 | 100 | 100 | 100 | 100 | 100 | 100 | 100 | 100 |
| solids on screen, ppm | 3 | 5 | 21 | 2 | 3 | 4 | 11 | 12 | 7 | 7 | 8 | 3 |
| 700 Mesh Screen, time, sec. | 108 | 109 | 190 | 190 | 150 | 120 | 184 | 148 | 132 | 210 | 224 | 185 |
| % through | 100 | 100 | 100 | 100 | 100 | 100 | 100 | 100 | 100 | 100 | 100 | 100 |
| solids on screen, ppm | 14 | 8 | 12 | 0 | 7 | 3 | 19 | 40 | 10 | 3 | 3 | 2 |
| Centrifugible Solids, stripped, wt. % | 4.85 | 12.67 | 2.42 | 3.62 | 5.12 | 16.74 | 5.55 | 5.50 | 7.75 | 4.85 | 10.15 | 13.70 |
| Clear Layer Before Tipping, % | 4 | 6 | 4 | 4 | 2 | 14 | 4 | 4 | 4 | 1 | 3 | 5 |

TABLE III

| Example | A | 15 | 16 | 17 | 18 | 19 | B | 20 | 21 | C | D | 22 | 23 |
|---|---|---|---|---|---|---|---|---|---|---|---|---|---|
| Polyol Blend | G | G/II | G/I | H/III | H/III | G/III | G | G/III | G/III | G/III | G/III | G/I | G/I |
| Ratio of L.M.W. to H.M.W. Polyols | 100/0 | 85/15 | 80/20 | 85/15 | | | 100/0 | 85/15 | 85/15 | 85/15 | 85/15 | 80/20 | 80/20 |
| Reaction Temp., °C | 125 | 125 | 125 | 125 | | | | | | | | | |
| Residence Time, min. | 51 | 12 | 12 | 12 | 18 | 12 | 12 | 12 | 18 | 18 | 18 | 12 | 12 |
| VAZO in feed, wt. % | 0.4 | 0.4 | 0.4 | 0.4 | 0.58 | 0.4 | 0.55 | 0.55 | 0.61 | 0.50 | 0.50 | 0.5 | 0.5 |
| Monomer + VAZO in feed, wt. % | 22.65 | 23.26 | 23.37 | 34.29 | 38.36 | 36.56 | 36.42 | 36.19 | 40.60 | 42.09 | 46.06 | 20.66 | 20.36 |
| A/S in feed | 100/0 | 100/0 | 100/0 | 78/22 | 78/22 | 70/30 | 78/22 | 78/22 | 78/22 | 78/22 | 78/22 | 40/60 | 33.2/66.8 |
| Polyol Feed Rate, gm/hr | 2144 | 2111 | 2102 | 1828 | 1133 | 1784 | 1768 | 1784 | 1084 | 1073 | 972 | 2200 | 2200 |
| Monomer + VAZO Feed Rate, gm/hr | 628 | 640 | 641 | 954 | 705 | 1028 | 1013 | 1012 | 741 | 780 | 830 | 573 | 565 |
| Product Weight, gm/hr | 2769 | 2743 | 2736 | 2750 | 1825 | 2796 | 2768 | 2776 | 1815 | 1850 | 1710 | 2760 | 2756 |
| Material Balance, % | 99.89 | 99.70 | 99.74 | 98.85 | 99.29 | 99.43 | 100.18 | 99.28 | 99.45 | 99.84 | 94.89 | 99.53 | 99.30 |
| Residual Acrylonitrile, % | 2.89 | 4.19 | 3.80 | 2.62 | 1.89 | 2.41 | 2.29 | 2.15 | 1.58 | 2.27 | | 1.09 | 1.05 |
| Styrene, % | — | — | — | 0.40 | 0.24 | 0.46 | 0.35 | 0.28 | 0.21 | 0.32 | | 1.14 | 2.25 |
| TMSN, % | 0.17 | 0.15 | 0.15 | 0.17 | 0.23 | 0.17 | 0.24 | 0.24 | 0.23 | 0.21 | | 0.20 | 0.23 |
| Conversions, Acrylonitrile, % | 87.0 | 81.73 | 83.5 | 90.20 | 93.63 | 90.53 | 91.85 | 92.32 | 94.97 | 93.01 | | 86.54 | 84.18 |
| Styrene, % | — | — | — | 94.70 | 97.13 | 95.78 | 95.58 | 96.45 | 97.63 | 96.50 | | 90.62 | 83.17 |
| Combined, % | 87.0 | 81.73 | 83.5 | 91.19 | 94.40 | 92.10 | 92.67 | 93.23 | 95.55 | 93.78 | | 88.99 | 83.50 |
| Poly A in Product by Calc., wt. % | 20.01 | 19.51 | 19.94 | 24.59 | 28.20 | 23.59 | 26.41 | 26.32 | 30.20 | 31.0 | Reactor Plugged- Run Not Completed. | 7.14 | 5.75 |
| Poly S in Product by Calc., wt. % | — | — | — | 7.28 | 8.25 | 10.70 | 7.75 | 7.75 | 8.76 | 9.07 | | 11.21 | 11.47 |
| Polymer in Product by Calc., wt. % | 20.01 | 19.51 | 19.94 | 31.87 | 36.45 | 34.29 | 34.16 | 34.07 | 38.96 | 40.07 | | 18.35 | 17.22 |
| Product Properties Viscosity (Brookfield) at 25° C, cps | 2004 | 2320 | 2780 | 2428 | 3200 | 3000 | 3532 | 2580 | 4430 | 6040 | | 1264 | 1280 |
| Calculated Hydroxyl No. mg KOH/gm | 45 | 41.5 | 40.34 | 35.56 | 33.17 | 33.85 | 36.60 | 33.96 | 31.45 | 30.87 | | 41.16 | 41.73 |
| Light Transmission, % | — | — | — | 58.5 | 57.5 | 54.8 | 54.0 | 59.0 | 57.5 | 64.7 | | 40.0 | 50.0 |
| Filtration Hindrance 150 Mesh Screen, % through solids on screen, ppm | 100 | 100 | 100 | 100 | 100 | 100 | 100 | 100 | 100 | 100 | | 100 | 100 |
|  | 20 | 4 | 9 | 8 | 6 | 6 | 4 | 20 | 10 | 14 | | 8 | 3 |
| 700 Mesh Screen, time, sec. % through solids on screen, ppm | ≥1200 | 182 | 240 | 156 | 160 | 650 | 600 | 174 | 600 | 300 | | 217 | 243 |
|  | 75.5 | 100 | 100 | 100 | 100 | 100 | 62.12 | 100 | 48.94 | 8 | | 100 | 100 |
|  | 28 | 10 | 12 | 8 | 8 | 18 | 28 | 10 | 30 | 188 | | 3 | 9 |
| Centrifugible Solids, stripped, wt. % | 19.44 | 15.71 | 22.28 | 5.27 | 5.94 | 8.39 | 8.07 | 5.10 | 8.24 | 17.37 | | 6.25 | 14.01 |
| Clear Layer Before Tipping, % | 6 | 4 | 4 | 2 | 2 | 2 | 2 | 2 | 2 | 2 | | 2 | 2 |

TABLE IV

| Example | 24 | 25 | 26 |
|---|---|---|---|
| Polyol Blend | I/II | I/II | I/III |
| Ratio of L.M.W. to H.M.W. Polyols, wt. % | 85/15 | 85/15 | 85/15 |
| Reaction Temp., °C. | 125 | 125 | 125 |
| Monomer + VAZO in feed, wt. % | 20.18 | 23.1 | 20.2 |
| A/S in feed, wt. % | 40/60 | 40/60 | 40/60 |
| Polymer in Product by Calc., wt. % | 17.34 | 20.29 | 17.36 |
| Viscosity (Brookfield) at 25° C., cps | 1460 | 1816 | 1620 |
| Centrifugible Solids, stripped, wt. % | 10.06 | 14.72 | 10.14 |
| Filtration Hindrance | | | |
| 150 Mesh Screen, % through | 100 | 100 | 100 |
| 700 Mesh Screen, % through | 100 | 100 | 100 |

EXAMPLES 27–30

In these Examples there was used a polyol blend of 85 wt. % Polyol K and 15 wt. % of Polyol III. The reaction temperature was 125° C. and the residence time was 12 minutes in each instance. Otherwise, the conditions and procedures shown in the following Table V and the general procedures described in the previous Examples were used.

TABLE V

| Example | 27 | 28 | 29 | 30 |
|---|---|---|---|---|
| VAZO in feed, wt. % | 0.4 | 0.43 | 0.45 | 0.43 |
| Monomer + VAZO in feed, wt.% | 32.51 | 34.65 | 36.51 | 35.06 |
| A/S in feed | 78/22 | 78/22 | 78/22 | 70/30 |
| Polyol Feed Rate, gm/hr | 1877 | 1833 | 1772 | 1815 |
| Monomer + VAZO Feed Rate, gm/hr | 904 | 972 | 1019 | 980 |
| Product Weight, gm/hr | 2776 | 2794 | 2783 | 2791 |
| Material Balance, % | 99.82 | 99.61 | 99.71 | 99.86 |
| Residual Acrylonitrile, % | 2.79 | 2.67 | 2.63 | 2.45 |
| Styrene, % | 0.37 | 0.36 | 0.35 | 0.45 |
| TMSN, % | 0.17 | 0.17 | 0.21 | 0.20 |
| Conversions, Acrylonitrile, % | 88.88 | 90.04 | 90.68 | 89.91 |
| Styrene, % | 94.77 | 95.23 | 95.60 | 95.67 |
| Combined, % | 90.17 | 91.18 | 91.76 | 91.67 |
| Poly A in Product by Calc., wt. % | 22.99 | 24.89 | 26.30 | 22.45 |
| Poly S in Product by Calc., wt. % | 6.91 | 7.43 | 7.82 | 10.24 |
| Polymer in Product by Calc., wt. % | 29.90 | 32.32 | 34.12 | 32.69 |
| Product Properties | | | | |
| Viscosity (Brookfield) at 25° C, cps | 2080 | 2464 | 2840 | 2580 |
| Calculated Hydroxyl No., mg KOH/gm | 40.01 | 38.63 | 37.60 | 38.42 |
| Light Transmission, % | — | 57 | 57 | 54 |
| Filtration Hindrance | | | | |
| 150 Mesh Screen, % through | 100 | 100 | 100 | 100 |
| solids on screen, ppm | 29 | 27 | 11 | 16 |
| 700 Mesh Screen, time, sec. | 198 | 192 | 194 | 191 |
| % through | 100 | 100 | 100 | 100 |
| solids on screen, ppm | 6 | 9 | 31 | 6 |
| Centrifugible Solids, stripped, wt. % | 6.11 | 7.19 | 8.71 | 11.14 |
| Clear Layer Before Tipping, % | 4 | 2 | 2 | 4 |

TABLE VI

| Examples | E | 31 | 32 | 33 | 34 | 35 |
|---|---|---|---|---|---|---|
| Polyol Blend | J | J/I | J/I | J/I | J/I | J/I |
| Ratio of L.M.W. to H.M.W. Polyols | 100/0 | 80/20 | 80/20 | 80/20 | 80/20 | 80/20 |
| Reaction Temp., °C. | 120 | 125 | 123 | 120 | 120 | 120 |
| Residence Time, min. | 12 | 12 | 12 | 12 | 12 | 12 |
| VAZO in feed, wt.% | 1.3 | 1.3 | 1.3 | 1.3 | 1.3 | 1.3 |
| Monomer + VAZO in feed, wt.% | 21.64 | 21.21 | 21.58 | 21.70 | 20.86 | 21.53 |
| A/S in feed | 30/70 | 30/70 | 25/75 | 20/80 | 30/70 | 25/75 |
| Polyol Feed Rate, gm/hr | 2220 | 2194 | 2180 | 2165 | 2216 | 2200 |
| Monomer + VAZO Feed Rate, gm/hr | 613 | 590 | 600 | 600 | 584 | 603 |
| Product Weight, gm/hr | — | 2768 | 2770 | 2753 | 2795 | 2772 |
| Material Balance, % | | 99.5 | 99.64 | 99.56 | 99.82 | 98.89 |
| Residual Acrylonitrile, % | Run Not Completed. Reactor Plugged | 1.02 | 0.97 | 1.03 | 1.11 | 1.14 |
| Styrene, % | | 2.23 | 3.43 | 5.53 | 2.36 | 3.67 |
| TMSN, % | | 0.61 | 0.62 | 0.62 | 0.61 | 0.63 |
| Conversions, Acrylonitrile, % | | 83.01 | 80.92 | 74.84 | 81.14 | 77.46 |
| Styrene, % | | 84.08 | 77.51 | 66.22 | 82.82 | 76.04 |
| Combined, % | | 83.76 | 78.37 | 67.94 | 82.31 | 76.45 |
| Poly A in Product by Calc., wt.% | | 5.13 | 4.29 | 3.27 | 4.94 | 4.12 |
| Poly S in Product by Calc., wt.% | | 12.13 | 12.34 | 11.56 | 11.78 | 12.11 |
| Polymer in Product by Calc., wt. % | | 17.26 | 16.63 | 14.83 | 16.72 | 16.23 |
| Product Properties | | | | | | |
| Viscosity (Brookfield) at 25° C., cps | | 1508 | 1560 | 1496 | 2072 | 1344 |
| Calculated Hydroxyl No., mg KOH/gm | | 35.8 | 36.07 | 36.85 | 36.03 | 36.25 |
| Light Transmission, % | | 41 | 47 | — | — | — |
| Filtration Hindrance | | | | | | |
| 150 Mesh Screen, % through | | 100 | 100 | 100 | 100 | 100 |
| solids on screen, ppm | | 16 | 19 | 22 | 22 | 51 |
| 700 Mesh Screen, time, sec. | | 350 | 600 | 400 | 1200 | 600 |
| % through | | 14.33 | 23.5 | 0.33 | 36.03 | 9.93 |
| solids on screen, ppm | | 181 | 81 | 201,969 | 265 | 330 |
| Centrifugible Solids, stripped, wt.% | | 8.99 | 17.23 | 30.91 | 20.76 | 16.7 |
| Clear Layer Before Tipping, % | | 0 | 6 | 76 | 2 | 6 |

TABLE VII

| Example | F | 36 | 37 |
|---|---|---|---|
| Polyol Blend | J | J/I | J/I |
| Ratio of L.M.W. to H.M.W. Polyols | 100/0 | 80/20 | 80/20 |

TABLE VII-continued

| Example | F | 36 | 37 |
|---|---|---|---|
| Reaction Temp., °C | 115 | 115 | 115 |
| Residence Time, min. | 12 | 12 | 12 |
| VAZO in feed, wt. % | 1.3 | 1.3 | 1.51 |
| Monomer + VAZO in feed, wt. % | 20.86 | 21.48 | 24.71 |
| A/MMA/S | 25/25/50 | 25/25/50 | 25/25/50 |
| Polyol Feed Rate, gm/hr | 2306 | 2204 | 2108 |
| Monomer + VAZO Feed Rate, gm/hr | 608 | 608 | 692 |
| Product Weight, gm/hr | | 2808 | 2792 |
| Material Balance, % | | 99.86 | 99.7 |
| Residual Acrylonitrile, % | | 1.47 | 1.55 |
| MMA,% | Run Not | 1.52 | 1.68 |
| Styrene, % | Completed. | 1.99 | 2.03 |
| TMSN, % | Reactor | 0.38 | 0.42 |
| Conversions, Acrylonitrile, % | Plugged. | 71.08 | 73.36 |
| MMA, % | | 70.1 | 71.12 |
| Styrene, % | | 80.42 | 82.55 |
| Combined, % | | 75.5 | 77.44 |
| Poly A in Product by Calc., wt. % | | 3.8 | 4.49 |
| Poly MMA in Product by Calc., wt. % | | 3.74 | 4.36 |
| Poly S in Product by Calc., wt. % | | 8.6 | 10.12 |
| Polymer in Product by Calc., wt. % | | 16.14 | 18.97 |
| Product Properties | | | |
| Viscosity (Brookfield) at 25° C, cps | | 1736 | 1708 |
| Calculated Hydroxyl No., mg KOH/gm | | 36.28 | 35.06 |
| Filtration Hindrance | | | |
| 150 Mesh Screen, % through | Run Not | 100 | 100 |
| solids on screen, ppm | Completed. | 15 | 22 |
| 700 Mesh Screen, time, sec. | Reactor | 300 | 300 |
| % through | Plugged. | 4.47 | 4.68 |
| solids on screen, ppm | | 1047 | 1132 |
| Centrifugible Solids, stripped, wt. % | | 14.12 | 15.89 |
| Clear Layer Before Tipping, % | | 0 | 0 |

EXAMPLES 38–48

In these examples, the polymer/polyols made in Examples 17, and 24 through 29 were compared with other polymer/polyols designated by "PP" and a number as identified more fully below. The following designations are used in these examples:

PP-1 An 18% copolymer content dispersion of a 50/50 acrylonitrile-styrene copolymer prepared in Polyol J using VAZO catalyst and having a hydroxyl no. of 36.9 mg KOH/gm.

PP-2 A 27.2% copolymer content dispersion of 72% acrylonitrile and 28% styrene copolymerized in Polyol L using VAZO and having a hydroxyl no. of 36.7 mg KOH/gm. and a viscosity of 2854 cps at 25° C.

PP-3 A 32.9% copolymer content dispersion of 78% acrylonitrile and 22% styrene copolymerized in Polyol H using TBPO and having a hydroxyl no. of 37.5 mg KOH/gm.

Amine catalyst A solution of 70 wt.% bis(2-dimethylamino ethyl) ether and 30 wt.% dipropylene glycol.

TDI A mixture of 80 wt.% 2,4-tolylene diisocyanate and 20 wt.% 2,6-tolylene diisocyanate.

Silicone Surfactant I

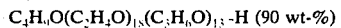

Silicone Surfactant II

A mixture of:

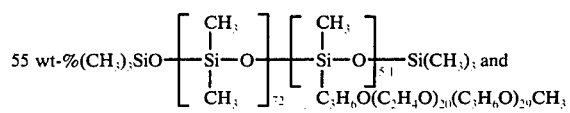

45 wt-% of an admixture of:

$C_4H_9O(C_2H_4O)_{18}(C_3H_6O)_{13}$-H (90 wt-%)

and $C_9H_{19}C_6H_4O[C_2H_4O]_{10.5}H$ (10 wt-%)

TEST PROCEDURES

The following test procedures were used in Examples appearing below:

| Test | Procedure |
|---|---|
| Indentation Load Deflection (ILD) | ASTM D1564-69 |
| Compression Set | ASTM D1564-69 |
| Tensile Strength | ASTM D1564-69 |
| Elongation | ASTM D1564-69 |
| Tear Resistance (Strength) | ASTM D1564-69 |
| Air Porosity | A specimen of foam ½ inch in thickness is compressed between two pieces of flanged plastic tubing 2¼ inches in diameter (ID). This assembly then becomes a component in an air flow system. Air at a controlled velocity enters one end of the tubing, flows through the foam specimen and exits through a restriction at the lower end of the assembly. The pressure drop across the foam due to the restriction of air passage is measured by means of an inclined closed manometer. One end of the manometer is connected to the upstream side of the foam and the other end to the downstream side. The flow of air on the upstream |

| Test | Procedure |
|---|---|
| | side is adjusted to maintain a differential pressure across the specimen of 0.1 inch of water. The air porosity of the foam is reported in units of air flow per unit area of specimen, cubic feet per minute per square foot. |

Low density flexible polyurethane foams were prepared from the polymer/polyols produced according to this invention as described in Examples 17, and 24–29 given above and, for purposes of comparison, from polymer/polyols which were not prepared according to this invention. The foam formulations given in Tables VIII, X and XI were used and the amounts given are in weight parts.

The foam formulations were converted to polyurethane foams using the following procedure. The surfactant, polymer/polyol and TDI were weighed into an 8-liter, baffled stainless steel, beaker and mixed 60 seconds at 2,000 rpm with two 2.5 inch 6 blade turbine stirrers (placed 2.5 inches apart at the base of the shaft). Stirring was stopped for fifteen seconds to de-gas and was continued again for five seconds. Water and the amine catalyst mixture were added and mixing continued an additional five seconds. The stannous octoate was then added and mixing continued for five seconds. The foaming mixture was poured into a 24 inch × 24 inch × 20 inch paper-lined box and foam rise time was recorded. The foam was allowed to cure overnight at room temperature. The physical properties of the foam were measured on a 6 inch sample taken from the bottom of upper half of foam bun.

The following physical properties of the foams were determined and are given in the Tables IX, X and XI.

TABLE VIII

| Examples | G | 38 | 39 | 40 | 41 | 42 |
|---|---|---|---|---|---|---|
| Polymer/Polyol: | | | | | | |
| PP-1 | 100 | | | | | |
| Ex 24 | | 100 | 100 | | | |
| Ex 25 | | | | 100 | 100 | |
| Ex 26 | | | | | | 100 |
| Solids | — | 17.34 | 17.34 | 20.29 | 20.29 | 17.36 |
| Polyol J | 100% | 85% | 85% | 85% | 85% | 85% |
| Polyol II | | 15% | 15% | 15% | 15% | |
| Polyol III | | | | | | 15% |
| Water | 3.5 | ———————→ | | | | |
| Amine Catalyst | 0.10 | ———————→ | | | | |
| Stannous Octoate | 0.20 | 0.20 | 0.325 | 0.30 | 0.275 | 0.275 |
| Silicone Surfactant I | 1.0 | ———————→ | | | | |
| TDI | 41.5 | 41.4 | 41.4 | 41.2 | 41.2 | 41.4 |
| Index | 105 | ———————→ | | | | |
| Rise Time, secs. | 113 | 140 | 100 | — | 698 | 102 |
| Remarks: | OK | External split | OK | Did not pop bubbles | OK | OK |

TABLE IX

| Example | G | 39 | 41 | 42 |
|---|---|---|---|---|
| Physical Properties: | | | | |
| Density, pcf | 1.76 | 1.73 | 1.77 | 1.77 |
| Air Porosity, ft$^3$/min/ft$^2$ | 86.1 | 74.2 | 79.6 | 87.3 |
| Resiliency, % | | | | |

TABLE IX-continued

| Example | G | 39 | 41 | 42 |
|---|---|---|---|---|
| ball rebound | 42 | 42 | 39 | 42 |
| ILD (lbs/50 in$^2$) | | | | |
| 25% | 55.5 | 55.5 | 62.0 | 58.3 |
| 65% | 110.5 | 104.0 | 114.8 | 106.8 |
| 25% Return, % | 61.6 | 59.3 | 57.7 | 58.7 |
| Load Ratio | 1.99 | 1.87 | 1.85 | 1.83 |
| Tensile Strength, psi | 18.0 | 18.2 | 20.0 | 18.8 |
| Elongation, % | 128 | 144 | 134 | 133 |
| Tear Resistance, pli | 2.50 | 2.45 | 2.66 | 2.89 |
| 90% Compression Set, Cd, % | 5.6 | 6.2 | 6.8 | 6.1 |

TABLE X

| Example | H | I | J | 43 | 44 |
|---|---|---|---|---|---|
| Polymer/Polyol: | | | | | |
| PP-2 | 100 | — | — | — | — |
| PP-3 | — | 100 | 100 | — | — |
| Ex. 17 | — | — | — | 100 | 100 |
| Water | 4.0 | ———————→ | | | |
| Amine catalyst | 0.10 | ———————→ | | | |
| Stannous Octoate | 0.30 | 0.25 | 0.30 | 0.30 | 0.325 |
| Silicone Surfactant II | 1.0 | ———————→ | | | |
| TDI (107 Index) | 47.4 | 47.5 | 47.5 | 46.8 | 46.8 |
| Foam Rise Time, secs. | 75 | 114 | 101 | 80 | 74 |
| Physical Properties: | | | | | |
| Density, pcf | 1.49 | 1.54 | 1.57 | 1.50 | 1.51 |
| Air Porosity, ft$^3$/min/ft$^2$ | 21.4 | 50.0 | 19.8 | 10.7 | 6.6 |
| Resiliency, % ball rebound | 26 | 23 | 24 | 26 | 22 |
| ILD (lbs/50 in$^2$) | | | | | |
| 25% | 89.8 | 91.3 | 96.0 | 93.8 | 92.0 |
| 65% | 167.5 | 170.0 | 187.5 | 170.3 | 171.0 |
| 25% Return, % | 48.7 | 46.2 | 46.0 | 45.4 | 46.3 |
| Load Ratio | 1.87 | 1.86 | 1.95 | 1.82 | 1.86 |
| Tensile Strength, psi | 20.8 | 23.1 | 23.0 | 22.6 | 22.8 |
| Elongation, % | 88 | 87 | 77 | 87 | 90 |
| Tear Resistance, pli | 2.00 | 2.05 | 2.60 | 2.26 | 2.31 |
| Compression Set, $C_d$, % | | | | | |
| 50% | 13.4 | — | 31.2 | 17.3 | 19.1 |
| 75% | 16.0 | — | 39.0 | 45.2 | 41.2 |
| 90% | 66.8 | 59.0 | 78.0 | 82.2 | 85.6 |

TABLE XI

| Example | K | 45 | 46 | 47 | 48 |
|---|---|---|---|---|---|
| Polymer/Polyol: | | | | | |
| PP-2 | 100 | | | | |
| Ex 17 | | 100 | | | |
| Ex 27 | | | 100 | | |
| Ex 28 | | | | 100 | |
| Ex 29 | | | | | 100 |
| Water | 4.0 | | | | |
| Amine catalyst | 0.10 | ———————→ | | | |
| Stannous Octoate | 0.275 | | | | |
| Silicone Surfactant II | 1.0 | | | | |
| TDI (107 Index) | 47.4 | 47.3 | 48.0 | 47.7 | 47.5 |
| Polymer/Polyol | | | | | |
| Polyol L | 100% | | | | |
| Polyol H | | 85% | | | |
| Polyol K | | | 85% | ———————→ | |
| Polyol III | | 15% | 15% | ———————→ | |
| Solids, % | 27.2 | 31.9 | 29.9 | 32.3 | 34.1 |
| Rise Time, secs. | 65 | 66 | 68 | 65 | 64 |
| Physical Properties: | | | | | |
| Density, pcf | 1.41 | 1.44 | 1.42 | 1.44 | 1.41 |
| Air Porosity, ft$^3$/min/ft$^2$ | 25.0 | 14.4 | 4.2 | 8.8 | 3.5 |
| Resiliency % ball rebound | 29 | 27 | 24 | 27 | 22 |
| ILD (lbs/50 in$^2$) | | | | | |
| 25% | 87.5 | 90.1 | 86.5 | 98.8 | 99.8 |
| 65% | 157.8 | 160.8 | 152.0 | 172.5 | 177.0 |
| 25% Return, % | 49.9 | 46.3 | 48.7 | 46.0 | 44.9 |
| Load Ratio | 1.80 | 1.78 | 1.76 | 1.75 | 1.77 |
| Tensile Strength, psi | 20.2 | 21.4 | 23.4 | 23.7 | 25.5 |

TABLE XI-continued

| Example | K | 45 | 46 | 47 | 48 |
|---|---|---|---|---|---|
| Elongation, percent | 85 | 75 | 95 | 82 | 86 |
| Tear Resistance, pli | 2.35 | 2.45 | 2.57 | 2.28 | 2.69 |
| 90% Compression Set, $C_t$, % | 59.9 | 71.8 | 62.2 | 68.4 | 78.0 |

As shown by data of Table X, the polymer/polyols of this invention can be used to produce flexible foams with higher load bearing suitable for carpet underlay or solid polyurethane elastomers with higher modulus with utility in automobile applications. Also, flexible foams made with polymer/polyols containing the lower ratios of acrylonitrile to styrene are relatively nondiscoloring along with having higher load bearing capacity as shown by the data of Tables VIII and IX. It might have been expected that the addition of 15 percent of a high molecular weight polyol in the foam formulation would lower the load properties of the foam by perhaps 10 percent. However, data of foam evaluation, as presented in Tables VIII, IX and X indicate that there is no loss in load bearing properties of the foam, which is unexpected.

vacuum stripped at 2 millimeters pressure and 120° to 130° C. for testing. Conversions are determined from gas chromatic analysis of the amount of unreacted monomers present in the crude product before stripping.

The experimental conditions and results of these Examples are given in Tables XII to XIX below. The polyols employed are identified hereinabove. Additional polyols employed in some of the following examples are described below.

Polyol IV Polypropylene oxide polyol made from propylene oxide and sorbitol, having a theoretical number average molecular weight of about 12,000 and a hydroxyl number of about 27.28.

Polyol V Polyol made from 65 wt.% propylene oxide and 35 wt.% ethylene oxide and sorbitol having a theoretical number average molecular weight of about 12,000 and a hydroxyl number of about 27.77. The alkylene oxide units are present primarily in blocks and the end units are substantially all ethylene oxide units, i.e., 15 wt.% of the ethylene oxide is used to "cap" the triol. The polyol contains about 44 wt.% ethylene oxide units based on the total product weight.

TABLE XII

| Example | L | 49 | 50 | 51 | 52 | M | N |
|---|---|---|---|---|---|---|---|
| Polyol Blend | I | G/I | G/I | G/I | G/I | G/I | G |
| Ratio of L.M.W. to H.M.W. Polyols | 0/100 | 60/40 | 80/20 | 90/10 | 94/6 | 98/2 | 100/0 |
| Reaction Temp., ° C. | 125 | 125 | 125 | 125 | 125 | 125 | 125 |
| Residence Time, min. | 20 | 12 | 12 | 12 | 12 | 12 | 12 |
| VAZO in Feed, wt.% | 0.5 | 0.5 | 0.5 | 0.5 | 0.5 | 0.5 | 0.5 |
| Monomer+VAZO in Feed, wt.% | 20.66 | 20.19 | 20.35 | 20.59 | 20.10 | 20.06 | 20.57 |
| A/S in Feed | 50/50 | 50/50 | 50/50 | 50/50 | 50/50 | 50/50 | 50/50 |
| Polyol Feed Rate, gm/hr. | 1344 | 2206 | 2208 | 2206 | 2210 | 2216 | 2216 |
| Monomer+VAZO Feed Rate, gm/hr | 350 | 558 | 564 | 572 | 556 | 556 | 574 |
| Product Weight, gm/hr | 1688 | 2738 | 2762 | 2776 | 2756 | 2768 | 2778 |
| Material Balance, % | 99.6 | 99.06 | 99.84 | 99.73 | 99.64 | 99.85 | 99.57 |
| Residual Acrylonitrile, % | 1.14 | 1.43 | 1.41 | 1.46 | 1.50 | 1.50 | 1.51 |
| Styrene, % | 0.675 | 0.907 | 1.02 | 1.06 | 1.04 | 1.07 | 1.13 |
| TMSN, % | 0.226 | 0.259 | 0.21 | 0.22 | 0.23 | 0.22 | 0.27 |
| Conversions, Acrylonitrile, % | 88.73 | 85.62 | 85.85 | 85.47 | 84.76 | 84.69 | 85.02 |
| , Styrene, % | 93.33 | 90.88 | 89.76 | 89.46 | 89.43 | 89.08 | 88.79 |
| , Combined, % | 91.03 | 88.25 | 87.80 | 87.46 | 87.09 | 86.88 | 86.90 |
| Poly A in Product by Calc., wt. % | 9.11 | 8.63 | 8.74 | 8.81 | 8.53 | 8.51 | 8.76 |
| Poly S in Product by Calc., wt.% | 9.58 | 9.17 | 9.13 | 9.22 | 9.00 | 8.95 | 9.15 |
| Polymer in Product by Calc., wt.% | 18.69 | 17.80 | 17.87 | 18.03 | 17.53 | 17.46 | 17.91 |
| Product Properties | | | | | | | |
| Viscosity (Brookfield) at 25° C, cps | 2880 | 1440 | 1184 | 1112 | 1012 | 1036 | 1040 |
| Calculated Hydroxyl No., mg KOH/gm | 24.13 | 37.22 | 41.47 | 43.52 | 44.64 | 45.54 | 45.72 |
| Light Transmission, % | 58.4 | 51.2 | 47.8 | 46.8 | 46.0 | 46.5 | 47.0 |
| Filtration Hindrance | | | | | | | |
| 150-Mesh Screen, % through | 100 | 100 | 100 | 100 | 100 | 100 | 100 |
| solids on screen, ppm | 7 | 4 | 4 | 7 | 11 | 4 | 5 |
| 700-Mesh Screen, time, sec. | 304 | 246 | 178 | 180 | 216 | 184 | 190 |
| , % through | 100 | 100 | 100 | 100 | 100 | 100 | 100 |
| solids on screen, ppm | 9 | 22 | 8 | 10 | 33 | 12 | 6 |
| Centrifugible Solids, stripped, wt.% | 2.25 | 2.75 | 4.31 | 5.60 | 7.03 | 9.27 | 10.38 |
| Clear Layer Before Tipping, % | 2 | 2 | 1 | 2 | 4 | 4 | 4 |

EXAMPLES 49–93 and L–O

Examples 49 through 93 and L through O are conducted continuously in a continuously stirred tank reactor fitted with baffles and an impeller generally run at 800 rpm. The feed components are pumped to the reactor continuously after going through an inline mixer to assure complete mixing of the feed components before entering the reactor. The internal temperature of the reactor is controlled to within one degree Centigrade by applying controlled heating or cooling to the outside of the reactor. The product from the reactor flows out through a back pressure regulator. (The regulator is adjusted to give 10 pounds per square inch gauge back pressure in the reactor.) Then the product flows through a water cooled tubular heat exchanger to a product receiver. Portions of the crude product are

TABLE XIII

| Example | O | 53 |
|---|---|---|
| Polyol Blend | E | E/III |
| Ratio of L.M.W. to H.M.W. Polyols | 100/0 | 90/10 |
| Reaction Temp., ° C. | 125 | 125 |
| Residence Time, min. | 12 | 12 |
| VAZO in Feed, Wt. % | 1.2 | 1.2 |
| Monomer + VAZO in Feed, wt.% | 22.89 | 22.43 |
| A/S in Feed | 100/0 | 100/0 |
| Polyol Feed Rate, gm/hr | 2142 | 2158 |
| Monomer + VAZO Feed Rate, gm/hr | 636 | 624 |
| Product Weight, gm/hr | 2740 | 2774 |
| Material Balance, % | 98.63 | 99.71 |
| Residual Acrylonitrile, % | 3.56 | 2.78 |
| Styrene, % | — | — |
| TMSN, % | 0.50 | 0.49 |
| Conversions, Acrylonitrile, % | 83.79 | 86.93 |
| , Styrene, % | — | — |
| , Combined, % | 83.79 | 86.93 |
| Poly A in Product by Calc., wt.% | 18.82 | 18.99 |

TABLE XIII-continued

| Example | 0 | 53 |
|---|---|---|
| Poly S in Product by Calc., wt.% | — | — |
| Polymer in Product by Calc., wt.% | 18.82 | 18.99 |
| Product Properties | | |
| Viscosity (Brookfield) at 25° C, cps | 800 | 1172 |
| Calculated Hydroxyl No., mg KOH/gm | 91.40 | 81.15 |
| Light Transmission, % | — | 72.8 |
| Filtration Hindrance | | |
| 150-Mesh Screen, % through | 100 | 100 |
| , solids on screen, ppm | 296 | 11 |
| 700-Mesh Screen, time, sec. | 900 | 150 |
| , % through | 36.5 | 100 |
| , solids on screen, ppm | 533 | 7 |
| Centrifugible Solids, stripped, wt.% | 57.98 | 20.36 |
| Clear Layer Before Tipping, % | 46 | 4 |

TABLE XIV

| Example | 54 | 55 | 56 |
|---|---|---|---|
| Polyol Blend | H/I | H/I | H/I |
| Ratio of L.M.W. to H.M.W. Polyols | 80/20 | 70/30 | 60/40 |
| Reaction Temp., ° C. | 125 | 125 | 125 |
| Residence Time, min. | 12 | 12 | 12 |
| VAZO in Feed, wt. % | 1.60 | 0.75 | 1.1 |
| Monomer+VAZO in Feed, wt.% | 32.11 | 32.78 | 33.33 |
| A/S in Feed | 40/60 | 40/60 | 40/60 |
| Polyol Feed Rate, gm/hr. | 1894 | 1876 | 1864 |
| Monomer + VAZO Feed Rate, gm/hr | 896 | 915 | 932 |
| Product Weight, gm/hr | 2786 | 2777 | 2790 |
| Material Balance, % | 99.86 | 99.50 | 99.78 |
| Residual Acrylonitrile, % | 1.28 | 1.41 | 1.30 |
| Styrene, % | 1.41 | 1.86 | 1.45 |
| TMSN, % | 0.70 | 0.34 | 0.58 |
| Conversions, Acrylonitrile, % | 89.53 | 89.05 | 89.94 |
| , Styrene, % | 92.31 | 90.37 | 92.52 |
| , Combined, % | 91.20 | 89.84 | 91.49 |
| Poly A in Product by Calc. wt.% | 11.25 | 11.80 | 11.94 |
| Poly S in Product by Calc., wt.% | 17.40 | 17.97 | 18.42 |
| Polymer in Product by Calc., wt.% | 28.65 | 29.77 | 30.36 |
| Product Properties | | | |
| Viscosity (Brookfield) at 25° C., cps | 2140 | 2572 | 2800 |
| Calculated Hydroxyl No., mg KOH/g, | 38.14 | 35.07 | 33.02 |
| Light Transmission, % | 47.0 | 45.7 | 45.8 |
| Filtration Hindrance | | | |
| 150-Mesh Screen, % through | 100 | 100 | 100 |
| , solids on screen, ppm | 11 | 17 | 2 |
| 700-Mesh Screen, time, sec. | 300 | 176 | 277 |
| , % through | 11.33 | 100 | 100 |
| , solids on screen, ppm | 35 | 11 | 16 |
| Centrifugible Solids, stripped, wt. % | 15.71 | 12.60 | 10.70 |
| Clear Layer Before Tipping, % | 4 | 2 | 2 |

TABLE XV

| Example | 57 | 58 | 59 | 60 | 61 | 62 | 63 | 64 | 65 | 66 | 67 | 68 |
|---|---|---|---|---|---|---|---|---|---|---|---|---|
| Polyol Blend | H/IV | → | → | K/IV | → | H/IV | → | H/I | → | → | K/I | → |
| Ratio of L.M.W. to H.M.W. Polyols, wt.% | 80/20 | 85/15 | 90/10 | 80/20 | 85/15 | 80/20 | 80/20 | 80/20 | → | → | → | → |
| Reaction Temp. ° C. | 125 | → | → | → | → | → | → | → | → | → | → | → |
| Residence time, min. | 12 | → | → | → | → | → | → | → | → | → | → | → |
| VAZO in Feed, wt.% | 0.8 | → | → | → | → | → | → | → | → | → | → | → |
| Monomer + VAZO in Feed, wt.% | 30.39 | 31.01 | 31.23 | 30.68 | 30.58 | 32.15 | 30.76 | 30.58 | 31.46 | 32.49 | 30.81 | 33.36 |
| A/S, wt.% | 40/60 | → | → | → | → | → | 35/65 | 40/60 | → | → | → | → |
| Polyol Feed Rate, gm/hr | 1935 | 1937 | 1940 | 1916 | 1923 | 1880 | 1922 | 1918 | 1926 | 1880 | 1913 | 1875 |
| Monomer + VAZO Feed Rate, gm/hr | 845 | 871 | 881 | 848 | 847 | 891 | 854 | 845 | 884 | 905 | 852 | 939 |
| Product Weight, gm/hr | 2762 | 2800 | 2812 | 2733 | 2741 | 2743 | 2762 | 2749 | 2786 | 2766 | 2723 | 2800 |
| Material Balance, % | 99.35 | 99.71 | 99.68 | 98.88 | 98.95 | 98.99 | 99.62 | 99.49 | 99.14 | 99.31 | 98.48 | 99.50 |
| Residual Acrylonitrile, % | 1.37 | 1.42 | 1.45 | 1.67 | 1.62 | 1.44 | 1.32 | 1.38 | 1.35 | 1.45 | 1.88 | 1.79 |
| Styrene, % | 1.54 | 1.47 | 1.69 | 1.67 | 1.60 | 1.59 | 1.71 | 1.43 | 1.64 | 1.76 | 1.83 | 1.81 |
| TMSN, % | 0.42 | 0.38 | 0.43 | 0.44 | 0.37 | 0.35 | 0.50 | 0.34 | 0.39 | 0.46 | 0.36 | 0.40 |
| Conversions, Acrylonitrile, % | 88.50 | 88.28 | 88.12 | 86.18 | 86.54 | 88.63 | 87.48 | 88.47 | 89.08 | 88.62 | 84.58 | 86.30 |
| Styrene, % | 91.39 | 91.91 | 90.77 | 90.79 | 91.13 | 91.63 | 91.26 | 92.04 | 91.15 | 90.79 | 89.99 | 90.76 |
| Combined, % | 90.23 | 90.46 | 89.71 | 88.95 | 89.30 | 90.43 | 89.94 | 90.61 | 90.32 | 89.93 | 87.83 | 88.98 |
| Poly A in Product by Calc., wt.% | 10.80 | 10.99 | 11.08 | 10.66 | 10.66 | 11.47 | 9.47 | 10.85 | 11.26 | 11.60 | 10.55 | 11.65 |
| Poly S in Product by Calc., wt.% | 16.73 | 17.17 | 17.12 | 16.85 | 16.83 | 17.79 | 18.35 | 16.93 | 17.28 | 17.83 | 16.83 | 18.37 |
| Polymer in Product by Calc., wt.% | 27.53 | 28.16 | 28.20 | 27.51 | 27.49 | 29.26 | 27.82 | 27.78 | 28.54 | 29.43 | 27.38 | 30.02 |
| Product Properties Viscosity (Brookfield) at 25° C., cps | 2160 | 2259 | 2584 | 2180 | 2576 | 2396 | 2000 | 2172 | 2412 | 2552 | 2308 | 2976 |
| Calculated Hydroxyl No., mg KOH/gm | 36.73 | 37.44 | 38.44 | 40.22 | 41.49 | 35.86 | 36.59 | 36.85 | 35.46 | 36.01 | 40.54 | 39.07 |
| Light Transmission, % | 46.5 | 47.0 | 53.5 | 44.5 | 50.0 | 46.0 | 49.8 | 45.0 | 46.3 | 49.8 | 47.0 | 59.8 |
| Filtration Hindrance 150-mesh screen, % through | 100 | 100 | 100 | 100 | 100 | 100 | 100 | 100 | 100 | 100 | 100 | 100 |
| solids on screen, ppm | 7 | 4 | 11 | 11 | 15 | 6 | 7 | 12 | 25 | 18 | 14 | 9 |
| 700-mesh screen, time, sec. | 524 | 600 | 1200 | 1200 | 749 | 1200 | 410 | 1200 | 407* | 1200 | 1200 | 250 |
| % through | 100 | 31 | 16.8 | 43.83 | 29.21 | 38.37 | 100 | 19* | 24.96* | 46.38 | 32.12 | 4.33 |
| solids on screen, ppm | 14 | 16 | 66 | 55 | 315 | 201 | 11 | 50 | 38 | 160 | 35 | 329 |
| Centrifugible Solids, | | | | | | | | | | | | |

TABLE XV-continued

| Example | 57 | 58 | 59 | 60 | 61 | 62 | 63 | 64 | 65 | 66 | 67 | 68 |
|---|---|---|---|---|---|---|---|---|---|---|---|---|
| stripped, wt.% | 10.97 | 15.76 | 21.81 | 11.15 | 16.23 | 17.25 | 10.46 | 10.47 | 12.74 | 15.74 | 15.76 | 19.93 |
| Clear Layer before Tipping, % | 2 | 2 | 4 | 2 | 2 | 2 | 2 | 2 | 2 | 2 | 2 | 2 |

NOTE: POLYOL H was stabilized with 500 ppm Ionol and 50 ppm phenothiazine.
*SEEDS formation suspected during start-up.

TABLE XVI

| Example | 69 | 70 | 71 | 72 | 73 | 74 | 75 | 76 | 76S* |
|---|---|---|---|---|---|---|---|---|---|
| Polyol Blend | H/IV | → | → | → | H/I | → | → | → | H/I |
| Ratio of L.M.W. to H.M.W. Polyol, wt.% | 80/20 | → | → | → | 80/20 | → | → | → | → |
| Reaction Temp. °C. | 125 | → | → | → | → | → | → | → | → |
| Residence Time, min. | 12 | → | → | → | → | → | → | → | 23 |
| VAZO in total Feed, wt.% | 1.2 | 1.40 | 1.51 | 1.60 | 1.2 | 1.40 | 1.52 | 1.60 | 1.58 |
| Monomer + VAZO in Feed, wt.% | 24.29 | 28.21 | 30.48 | 32.33 | 24.22 | 28.21 | 30.72 | 32.11 | 15.11 |
| A/S, wt.% | 40/60 | → | → | → | → | → | → | → | → |
| Polyol Feed Rate, gm/hr | 2094 | 1990 | 1923 | 1890 | 2121 | 2016 | 1935 | 1894 | 1213* |
| Monomer + VAZO Feed Rate, gm/hr | 672 | 782 | 843 | 903 | 678 | 792 | 858 | 896 | 243 |
| Product Weight, gm/hr | 2751 | 2760 | 2754 | 2787 | 2778 | 2796 | 2772 | 2786 | 1444 |
| Material Balance, % | 99.46 | 99.57 | 99.57 | 99.78 | 99.25 | 99.57 | 99.25 | 99.86 | 99.17 |
| Residual Acrylonitrile, % | 1.29 | 1.27 | 1.33 | 1.25 | 1.31 | 1.28 | 1.26 | 1.28 | — |
| Styrene, % | 1.71 | 1.51 | 1.61 | 1.51 | 1.72 | 1.53 | 1.50 | 1.41 | — |
| TMSN, % | 0.62 | 0.62 | 0.64 | 0.65 | 0.59 | 0.60 | 0.65 | 0.70 | — |
| Conversions, Acrylonitrile, % | 86.11 | 88.21 | 88.59 | 89.85 | 85.88 | 88.11 | 80.29 | 89.53 | — |
| Conversions, Styrene, % | 87.72 | 90.65 | 90.78 | 91.83 | 87.64 | 90.53 | 91.50 | 92.31 | — |
| Conversions, Combined, % | 87.08 | 89.68 | 89.89 | 91.04 | 86.94 | 89.56 | 90.62 | 91.20 | — |
| Poly A in Product by Calc., wt.% | 8.21 | 9.74 | 10.59 | 11.37 | 8.16 | 9.73 | 10.74 | 11.25 | 7.2** |
| Poly S in Product by Calc., wt.% | 12.54 | 15.02 | 16.27 | 17.43 | 12.50 | 15.00 | 16.50 | 17.40 | 11.41** |
| Polymer in Product by Calc., wt.% | 20.75 | 24.76 | 26.86 | 28.80 | 20.66 | 24.73 | 27.24 | 28.65 | 18.69** |
| Product Properties | | | | | | | | | |
| Viscosity (Brookfield) at 25° C., cps | 1600 | 1764 | 2020 | 2200 | 1416 | 1760 | 1984 | 2140 | 1432 |
| Calculated Hydroxyl No., mg KOH/gm | 42.14 | 40.0 | 38.89 | 37.86 | 42.41 | 40.24 | 38.90 | 38.14 | 43.47 |
| Light Transmission, % | 35.8 | 42.0 | 44.2 | 46.5 | 36.8 | 46.2 | 45.8 | 47.0 | 74.5 |
| Filtration Hindrance | | | | | | | | | |
| 150-mesh screen, % through | 100 | 100 | 100 | 100 | 100 | 100 | 100 | 100 | 9.57 |
| solids on screen, ppm | 7 | 2 | 7 | 5 | 29 | 27 | 9 | 11 | 778 |
| 700-mesh screen, time, sec. | 200 | 219 | 597 | 600 | 216 | 220 | 1200 | 300 | 300 |
| 700-mesh screen, % through | 100 | 100 | 100 | 22.5 | 100 | 100 | 41.16 | 11.33 | 0.85 |
| solids on screen, ppm | 7 | 6 | 7 | 40 | 15 | 20 | 24 | 35 | 9161 |
| Centrifugible Solids, stripped, wt. % | 3.61 | 9.23 | 11.23 | 13.17 | 4.53 | 13.78 | 12.61 | 15.71 | 34.49 |
| Clear Layer before Tipping, % | 2 | 2 | 2 | 2 | 2 | 2 | 2 | 4 | 40 |

Note: Polyol H was stabilized with 1500 ppm Ionol, 1500 ppm phenyl diisodecyl phosphite and 50 ppm of phenothiazine and had a hydroxyl number of about 59.5.
*contained 49.01 wt. % toluene in feed.
**toluene free basis

TABLE XVII

| Example | 77 | 78 | 79 | 80 | 81 | 82 | 83 |
|---|---|---|---|---|---|---|---|
| Polyol Blend | H/IV | → | → | → | → | → | → |
| Ratio of L.M.W. to H.M.W. Polyol, wt.% | 80/20 | → | → | → | → | → | → |
| Reaction Temp., °C. | 125 | → | → | → | → | → | → |
| Residence Time, min. | 12 | → | → | → | → | → | → |
| VAZO in total Feed, wt.% | 1.51 | 0.8 | 0.7 | 0.6 | 0.5 | 0.4 | 0.3 |
| Monomer + VAZO in Feed, wt.% | 30.48 | 29.85 | 30.13 | 30.21 | 29.89 | 30.34 | 30.38 |
| A/S, wt.% | 40/60 | → | → | → | → | → | → |
| Polyol Feed Rate, gm/hr | 1923 | 2002 | 1978 | 1968 | 1921 | 1924 | 1932 |
| Monomer + VAZO Feed Rate, gm/hr | 843 | 852 | 853 | 852 | 819 | 838 | 843 |
| Product Weight, gm/hr | 2754 | 2839 | 2807 | 2806 | 2730 | 2748 | 2760 |
| Material Balance, % | 99.57 | 99.48 | 99.16 | 99.50 | 99.63 | 99.49 | 99.46 |
| Residual Acrylonitrile, % | 1.33 | 1.39 | 1.38 | 1.39 | 1.77 | 1.84 | 1.99 |
| Styrene, % | 1.61 | 1.69 | 1.69 | 1.67 | 2.33 | 2.60 | 2.62 |
| TMSN, % | 0.64 | 0.40 | 0.34 | 0.29 | 0.29 | 0.19 | 0.18 |
| Conversions, Acrylonitrile, % | 88.57 | 88.10 | 88.37 | 88.32 | 85.0 | 84.71 | 83.55 |
| Conversions, Styrene, % | 90.78 | 90.36 | 90.51 | 90.64 | 86.83 | 85.60 | 85.56 |
| Conversions, Combined, % | 89.89 | 89.45 | 89.65 | 89.71 | 86.10 | 85.24 | 84.75 |
| Poly A in Product by Calc., wt.% | 10.59 | 10.57 | 10.73 | 10.79 | 10.42 | 10.62 | 10.54 |
| Poly S in Product by Calc., wt.% | 16.27 | 16.26 | 16.49 | 16.62 | 15.98 | 16.09 | 16.18 |
| Polymer in Product by Calc., wt.% | 26.86 | 26.83 | 27.22 | 27.41 | 26.40 | 26.71 | 26.72 |
| Product Properties | | | | | | | |
| Viscosity (Brookfield) at 25° C., cps | 2020 | 2028 | 2018 | 2100 | 2040 | 2000 | 2008 |
| Calculated Hydroxyl No., mg KOH/gm | 38.89 | 38.90 | 38.69 | 38.60 | 39.13 | 38.97 | 38.96 |
| Light Transmission, % | 44.2 | 45.0 | 44.2 | 45.5 | 43.5 | 44.3 | 45.0 |

TABLE XVII-continued

| Example | 77 | 78 | 79 | 80 | 81 | 82 | 83 |
|---|---|---|---|---|---|---|---|
| Filtration Hindrance | | | | | | | |
| 150-mesh screen, % through | 100 | 100 | 100 | 100 | 100 | 100 | 100 |
| solids on screen, ppm | 7 | 37 | 20 | 15 | 3 | 4 | 6 |
| 700-mesh screen, time, sec. | 597 | 472 | 1200 | 454 | 250 | 270 | 256 |
| 700-mesh screen, % through | 100 | 100 | 100 | 100 | 100 | 100 | 100 |
| solids on screen, ppm | 7 | 33 | 28 | 11 | 2 | 4 | 4 |
| Centrifugible Solids, stripped, wt.% | 11.23 | 14.35 | 14.40 | 15.35 | 15.05 | 18.05 | 18.07 |
| Clear Layer before Tipping, % | 2 | 2 | 2 | 2 | 3 | 2 | 4 |

Note: Polyol H was stabilized in same manner and had the same hydroxyl as described in Table XVI.

TABLE XVIII

| Example | 84 | 85 | 86 | 87 | 88 | 89 | 90 |
|---|---|---|---|---|---|---|---|
| Polyol Blend | G/V | → | → | → H/I | → | → | H/IV |
| Ratio of L.M.W. to H.M.W. Polyol, wt.% | 80/20 | 80/20 | 80/20 | 80/20 | 80/20 | 80/20 | 80/20 |
| Reaction Temp., °C. | 125 | 125 | 125 | 125 | 125 | 125 | 125 |
| Residence Time, min. | 12 | 12 | 12 | 12 | 12 | 12 | 12 |
| VAZO in Feed, wt.% | 1.3 | 1.51 | 1.71 | 1.92 | 0.47 | 0.60 | 0.80 |
| Monomer + VAZO in Feed, wt.% | 21.17 | 24.78 | 28.06 | 31.43 | 28.20 | 32.17 | 30.39 |
| A/S, wt.% | 40/60 | 40/60 | 40/60 | 40/60 | 40/60 | 40/60 | 40/60 |
| Polyol Feed Rate, gm/hr | 2212 | 2076 | 2030 | 1920 | 2021 | 1948 | 1935 |
| Monomer + VAZO Feed Rate, gm/hr | 594 | 684 | 792 | 880 | 794 | 924 | 845 |
| Product Weight, gm/hr | 2774 | 2740 | 2788 | 2796 | 2803 | 2850 | 2762 |
| Material Balance, % | 98.86 | 99.27 | 99.79 | 99.86 | 99.57 | 99.23 | 99.35 |
| Residual Acrylonitrile, % | 1.14 | 1.31 | 1.15 | 1.31 | 1.48 | 1.54 | 1.37 |
| Styrene, % | 1.41 | 1.42 | 1.19 | 1.20 | 1.76 | 1.81 | 1.54 |
| TMSN, % | 0.67 | 0.82 | 0.79 | 1.06 | 0.26 | 0.30 | 0.42 |
| Conversions, Acrylonitrile, % | 85.83 | 86.02 | 89.22 | 88.91 | 86.72 | 87.90 | 88.50 |
| Conversions, Styrene, % | 88.31 | 89.90 | 92.56 | 93.23 | 89.47 | 90.51 | 91.39 |
| Conversions, Combined % | 87.30 | 88.35 | 91.23 | 91.51 | 88.36 | 89.47 | 90.23 |
| Poly A in Product by Calc., wt.% | 7.01 | 8.24 | 9.64 | 10.79 | 9.95 | 11.49 | 10.80 |
| Poly S in Product by Calc., wt.% | 10.82 | 12.92 | 15.00 | 16.97 | 15.39 | 17.74 | 16.73 |
| Polymer in Product by Calc., wt.% | 17.83 | 21.16 | 24.54 | 27.76 | 25.34 | 29.23 | 27.53 |
| Product Properties | | | | | | | |
| Viscosity (Brookfield) at 25° C., cps | 1720 | 1976 | 2280 | 2504 | 1840 | 2516 | 2160 |
| Calculated Hydroxyl No., mg KOH/gm | 41.11 | 39.44 | 37.70 | 36.14 | 38.10 | 36.11 | 36.73 |
| Light Transmission, % | 45.5 | 41.0 | 45.0 | 38.2 | 48.0 | 49.8 | — |
| Filtration Hindrance | | | | | | | |
| 150-Mesh Screen, % through | 100 | 100 | 100 | 100 | 100 | 100 | 100 |
| solids on screen, ppm | 7 | 7 | 28 | 31 | 53 | 6 | 7 |
| 700-Mesh Screen, time, sec. | 600 | 600 | 270 | 500 | 201 | 1200 | 524 |
| 700-Mesh Screen, % through | 8 | 19.83 | 100 | 5.5 | 100 | 96.6 | 100 |
| solids on screen, ppm | 319 | 61 | 26 | 1127 | 9 | 35 | 14 |
| Centrifugal Solids, stripped, wt.% | 6.94 | 7.99 | 9.61 | 12.12 | 11.58 | 14.74 | 10.97 |
| Clear Layer before Tipping, % | 3 | 2 | 2 | 2.5 | 4 | 4 | 2 |

TABLE XIX

| Example | 91 | 92 | 93 |
|---|---|---|---|
| Polyol Blend | J/III | K/III | K/III |
| Ratio of L.M.W. to H.M.W. Polyol, wt.% | 85/15 | 85/15 | 85/15 |
| Reaction Temp., °C. | 120 | 125 | 125 |
| VAZO in total Feed, wt.% | 0.4 | 0.8 | 0.64 |
| Stabilizer, wt.% in Feed | — | 5.62(1) | 5.27(2) |
| Monomer + VAZO in Feed, wt.% | 19.9 | 32.55 | 29.8 |
| Ratio of Acrylonitrile to Styrene, wt.% | (approx.) 40/60 | 40/60 | 40/60 |
| Polyol + Stabilizer Feed Rate, gm/hr (3) | 300 (4) | 1898 | 1946 |
| Monomer + VAZO Feed Rate, gm/hr | (5) | 916 | 826 |
| Product Weight, gm/hr | — | 2806 | 2752 |
| Material Balance, % | — | 99.71 | 99.28 |
| Residual Acrylonitrile, % | 0–0.01(6) | 1.23 | 1.44 |
| , Styrene, % | 0.09–0.12(6) | 1.30 | 1.73 |
| , TSMN, % | 0.05–0.13(6) | 0.41 | 0.28 |
| Conversions, Acrylontrile, % | — | 90.34 | 87.74 |
| , Styrene, % | — | 93.20 | 90.18 |
| , Combined, % | — | 92.06 | 89.21 |
| Total Poly A in Product by Calc., wt.% | 6.81–7.29(6) | 11.78 | 11.51 |
| Total Poly S in Product by Calc., wt.% | 9.37–10.51(6) | 18.23 | 17.75 |
| Total Polymer in Product by Calc., wt.% | 18.2 | 30.01 | 29.26 |
| Properties | | | |
| Viscosity (Brookfield) at 25° C., cps | 1638 | 2336 | 1928 |
| Calculated Hydroxyl No., mg KOH/gm | 35 | 36.75 | 37.38 |
| Filtration Hindrance | | | |
| 150-Mesh Screen, % through | 100 | 100 | 100 |
| , solids on screen, ppm | 15 | 28 | 49 |
| 700-Mesh Screen, time, sec. | 391 | 1200 | 800 |
| , % through | 100 | 67.66 | 100 |
| , solids on screen, ppm | 14 | 79 | 12 |
| Centrifugible Solids, wt.% | 10.3 | 2.82 | 2.43 |

TABLE XIX-continued

| Example | 91 | 92 | 93 |
|---|---|---|---|
| Light transmission, % | 50 | — | — |

Notes to Table XIX
1: Stabilizer prepared by reacting the reaction product of two mols of polypropylene oxide-butanol adduct of about 2550 molecular weight and one mol of TDI in toluene chemically bonded to a copolymeric anchor portion of acrylonitrile and styrene in a ratio of 30 to 70 wt.% pursuant to example 247 of application Ser. No. 752,818, filed December 20, 1976 by R. Van Cleve et al, now U.S. Pat. No.
2: Stabilizer prepared from the reaction product of propylene oxide and glycerine having a molecular weight of 6000 and a copolymeric anchor portion made from acrylonitrile and styrene in a ratio of 30 to 70 wt.% pursuant to example 248 of the above-identified copending application.
3: Example 91 did not contain stabilizer. In Examples 92, the solvent used in the preparation of the stabilizer was stripped before blending with the polyol blend. In Example 93, the stabilizer was used without stripping the solvent.
4: Gallons per hour.
5: Varied from about 36 to about 41 gals/hr. for acrylonitrile and about 47 to about 54 gals./hr. for styrene.
6: Determined by analysis.

EXAMPLES 94–127 AND P-II

In these examples, the polymer/polyols made in accordance with this invention were compared in the manufacture of foams with other polymer/polyols designated by "PP" and a number as identified hereinabove and below. The following additional designations are used in these examples:

PP-4 An 18 wt.% copolymer content dispersion of a 55/45 acrylonitrile-styrene copolymer prepared in Polyol G using VAZO catalyst and having a hydroxyl no. of 44.3 mg KOH/gm.

PP-5 A 29.6 wt.% copolymer content dispersion of a 78/22 acrylonitrile styrene copolymer prepared in a triol made from propylene oxide and ethylene oxide and glycerine and having a theoretical number average molecular weight of about 5000 and a hydroxyl number of about 34. The alkylene oxide units of the triol are present primarily in blocks and the end units are substantially all ethylene oxide units, i.e., the ethylene oxide is used to "cap" the triol. Based on its total weight, this triol contains about 14 wt.% $C_2H_4O$.

Tert. Amine Catalyst A mixture of tertiary amines.
Blowing Agent 1 Fluorotrichloromethane.

Low density flexible polyurethane foams were prepared from the polymer/polyols produced according to this invention as described in Tables XII–XIX given above and, for purposes of comparison, from polymer/polyols which were not prepared according to this invention. The foam formulations given in Tables XX–XXVIII were used and the amounts given are in weight parts.

The foam formulations were converted to polyurethane foams using the following procedure. The surfactant, polymer/polyol and TDI were weighed into an 8-liter, baffled, stainless steel beaker and mixed 60 seconds at 2,000 rpm with two 2.5 inch 6 blade turbine stirrers (placed 2.5 inches apart at the base of the shaft). Stirring was stopped for fifteen seconds to de-gas and was continued again for five more seconds. Water and the amine catalyst mixture were added and mixing continued an additional five seconds. The stannous octoate was then added and mixing continued for five seconds. The foaming mixture was poured into a 24 inches × 24 inches × 20 inches paper-lined box and foam rise time was recorded. The foam was allowed to cure overnight at room temperature. The physical properties of the foam were measured on a 6 inch sample taken from the bottom of upper half of foam bun.

The physical properties of the foams were determined and are given in Tables XXI–XXVIII. The following additional test procedures were also used:

Cream Time

The interval of time from the formation of the complete foam formulation to the appearance of a creamy color in the formulation. The creaming time is proportional to the rate of reaction of the formulation.

Rise Time

The interval of time from the formation of the complete foam formulation to the attainment of the maximum height of the foam.

Breathability

ASTM D-1564-69.

Reflectance Or Color-Eye Reflectance

Using an IDL color eye model no. D1, made by Kollmorgen Corp., Attleboro, Mass., a numerical rating of from 0 to 100 is made on the test specimen by comparison to a series of standards. A rating of "100" corresponds to a specimen rated as being white.

Normalized ILD Values

For purposes of comparison ILD values measured at the actual density of the foam are converted to "normalized" ILD values at a second density by linear proportion, i.e., the normalized ILD value is calculated by multiplying the measured ILD value by the second density and dividing by the actual density.

Load Ratio

Ratio of 65% deflection ILD value to 25% deflection ILD value.

Silicone Surfactant III

A mixture of a non-hydrolyzable siliconeoxyalkylene block copolymers comprising blocks of dimethylsiloxy units and blocks of prolylene oxide units and ethylene oxide units.

TABLE XX

| Example | P | 94 | 95 | 96 | 97 | 98 | 99 | 100 | 101 |
|---|---|---|---|---|---|---|---|---|---|
| PP-2 | 100 | | | | | | | | |
| Polyols: | | | | | | | | | |

TABLE XX-continued

| Example | P | 94 | 95 | 96 | 97 | 98 | 99 | 100 | 101 |
|---|---|---|---|---|---|---|---|---|---|
| J | | | 85 | | | | | | |
| H | | | | 80 | 85 | 90 | | | 80 |
| K | | 85 | | | | | 80 | 85 | |
| III | | | 15 | | | | | | |
| IV | | 15 | | 20 | 15 | 10 | 20 | 15 | |
| I | | | | | | | | | 20 |
| OH No., mg KOH/gm | 36.7 | 36.52 | 37 | 37.36 | 37.95 | 39.01 | 39.01 | 41.73 | 37.12 |
| A/S Ratio | 73/27 | 40/60 | 40/40 | 40/60 | → | → | → | → | → |
| Total Solids, wt.% | 27.2 | 28.75 | 18 | 27.53 | 28.16 | 28.20 | 27.51 | 27.49 | 27.78 |
| Acid No., meq/gm | — | — | — | 0.03 | 0.034 | 0.033 | 0.024 | 0.028 | 0.03 |
| Water, wt.% | — | — | — | 0.02 | 0.034 | 0.014 | 0.033 | 0.03 | 0.014 |
| Polymer/polyol same as or similar to | Comm'l Product | Ex. 93 | Ex. 91 | Ex. 57 | Ex. 58 | Ex. 59 | Ex. 60 | Ex. 61 | Ex. 64 |

TABLE XXI

| Example | P | 94 | 95 | 95a | 95b | 96 | 97 | 98 | 99 | 100 | 101 |
|---|---|---|---|---|---|---|---|---|---|---|---|
| Formulations, pphp | | | | | | | | | | | |
| Polymer/Polyol: | | | | | | | | | | | |
| PP-2 | 100 | | | | | | | | | | |
| Similar to Ex. 91 | | 100 | | | | | | | | | |
| Similar to Ex. 93 | | | 100 | 100 | 100 | | | | | | |
| Same as Ex. 57 | | | | | | 100 | | | | | |
| Same as Ex. 58 | | | | | | | 100 | | | | |
| Same as Ex. 59 | | | | | | | | 100 | | | |
| Same as Ex. 60 | | | | | | | | | 100 | | |
| Same as Ex. 61 | | | | | | | | | | 100 | |
| Same as Ex. 64 | | | | | | | | | | | 100 |
| Water | 4.0 | → | → | → | → | → | → | → | → | → | → |
| Amine Catalyst | 0.1 | → | → | → | → | → | → | → | → | → | → |
| Stannous Octoate | 0.3 | → | → | 0.375 | 0.375 | 0.3 | → | → | → | → | → |
| Silicone Surfactant II | 1.0 | → | → | → | → | → | → | → | → | → | → |
| TDI, 107 Index | 47.4 | → | → | → | → | 47.5 | 47.6 | 47.8 | 47.8 | 48.3 | 47.4 |
| Rise Time, secs. | 91 | 88 | Split | 147 | 145 | 102 | 106 | 98 | 97 | 107 | 99 |
| Physical Properties | | | | | | | | | | | |
| Density, lbs/ft³ | 1.49 | 1.55 | — | 1.53 | 1.55 | 1.54 | 1.57 | 1.54 | 1.54 | 1.56 | 1.55 |
| Air Porosity, ft³/min/ft² | 29.2 | 31.9 | — | 67.5 | 55.0 | 56.6 | 55.5 | 37.0 | 45.5 | 57.6 | 47.7 |
| Resiliency, % ball rebound | 29 | 33 | — | 29 | 30 | 33 | 32 | 32 | 31 | 30 | 31 |
| ILD(lbs/50 in²) | | | | | | | | | | | |
| 25% | 92.5 | 68.5 | — | 72.2 | 71.8 | 80.4 | 80.8 | 85.8 | 87.1 | 81.8 | 84.0 |
| 65% | 191.5 | 137.8 | — | 147.0 | 146.8 | 162.8 | 166.0 | 175.3 | 176.8 | 168.0 | 170.5 |
| 25% Return, % | 50.5 | 56.4 | — | 48.5 | 49.6 | 52.6 | 52.6 | 51.9 | 51.5 | 51.7 | 52.3 |
| Support Factor | 2.07 | 2.01 | — | 2.04 | 2.04 | 2.02 | 2.05 | 2.04 | 2.03 | 2.05 | 2.03 |
| Tensile Strength, lb/in² | 22.4 | 21.0 | — | 16.7 | 16.8 | 20.8 | 20.3 | 20.4 | 20.0 | 20.0 | 20.8 |
| Elongation, % | 87 | 139 | — | 70 | 66 | 91 | 84 | 82 | 81 | 85 | 89 |
| Tear Resistance, lb/in | 2.03 | 2.57 | — | 1.22 | 1.34 | 2.07 | 1.85 | 1.61 | 1.90 | 1.75 | 2.03 |
| Compression Set, $C_t$, % | | | | | | | | | | | |
| 75% | 35.0 | 9.7 | — | 48.9 | 35.0 | 14.8 | 14.6 | 32.5 | 28.1 | 36.7 | 19.0 |
| 90% | 53.6 | 19.7 | — | 59.4 | 58.2 | 30.5 | 42.8 | 43.7 | 25.4 | 48.6 | 43.0 |

TABLE XXII

| Example | R | | 102 | | 103 | 104 | 105 |
|---|---|---|---|---|---|---|---|
| PP-4 | 100 | | | | | | |
| Polyols: | | | | | | | |
| J | | | 85 | | 80 | 80 | 80 |
| III | | | 15 | | | | |
| I | | | | | 20 | 20 | 20 |
| A/S Ratio | 55/45 | | 40/60 | | 30/70 | 30/70 | 25/75 |
| Solids Content, % | ~18 | | ~18 | | 17.3 | 16.7 | 16.2 |
| OH No., mg KOH/gm | 44.3 | | 35.3 | | 34.4 | 36.0 | 36.3 |
| | (a) | (b) | (a) | (b) | | | |
| Rise Time, secs. | 84 | 92 | 75 | 85 | 78 | 89 | 88 |
| Density, pcf | 1.45 | 1.50 | 1.43 | 1.50 | 1.47 | 1.55 | 1.57 |
| Air Porosity ft³/min/ft² | 55.5 | 60.4 | 6.3 | 29.2 | 29.2 | 44.9 | 39.6 |
| Resiliency, % ball rebound | 35 | 35 | 28 | 35 | 37 | 36 | 35 |
| ILD (lbs/50 in²) | | | | | | | |
| 25% | 68.8 | 70.7 | 70.2 | 70.4 | 41.8 | 41.8 | 46.7 |
| 65% | 120.3 | 125.3 | 123.5 | 125.3 | 80.7 | 82.6 | 90.2 |
| 25% Return, % | 55.8 | 54.4 | 50.6 | 51.3 | 53.8 | 54.6 | 54.4 |
| Load Ratio | 1.75 | 1.77 | 1.76 | 1.78 | 19.3 | 1.98 | 1.93 |
| Polymer/polyol | Comm'l | | | | | | |

TABLE XXII-continued

| Example | R | 102 | 103 | 104 | 105 |
|---|---|---|---|---|---|
| same as or similar to: | Product | Ex. 26 | Ex. 30 | Ex. 34 | Ex. 35 |

Note: In each case the formulation for foaming contained, in parts by weight 100 parts polymer/polyol, 4.0 parts water, 0.1 part amine catalyst, 0.3 part stannous octoate, 1.0 part silicone surfactant II and 110 Index TDI.

TABLE XXIII

| | Formulations | | | | |
|---|---|---|---|---|---|
| Example | S | T | U | 106 | 107 |
| Polymer/polyol | | | | | |
| PP-2 | 100 | — | — | — | — |
| PP-1 | — | 100 | — | — | — |
| PP-5 | — | — | 100 | — | — |
| Same or similar to Ex. 93 | — | — | — | 100 | — |
| Same or similar to Ex. 55 | — | — | — | — | 100 |
| Water | 2.5 | 2.5 | 2.5 | 2.5 | 2.5 |
| Silicon Surfactant I | 0.5 | 0.5 | 0.2 | 0.5 | 0.5 |
| Tertiary Amine Catalyst | 0.2 | 0.2 | 0.3 | 0.2 | 0.2 |
| Stannous Octoate | 0.15 | 0.2 | 0.04 | 0.25 | 0.2 |
| TDI, Index 110 | 32.5 | 32.8 | 30.9 | 32.8 | 32.8 |
| Foam Physical Properties | | | | | |
| Density, lb/ft$^3$ | 2.30 | 2.34 | 2.37 | 2.31 | 2.26 |
| Hardness, 4-Inch ILD, lb/50 in$^2$ | | | | | |
| 25% deflection | 122 | 84 | 127 | 108 | 103 |
| 65% deflection | >250 | 158 | >250 | 215 | 201 |
| 25% return | 77 | 57 | 73 | 68 | 68 |
| Tensile Strength, psi | 27 | 23 | 28 | 22 | 27 |
| Tear Resistance, lb/in | 2.2 | 2.8 | 2.8 | 1.3 | 2.2 |
| Elongation, % | 90 | 130 | 110 | 75 | 95 |
| Compression Set from 90% Deflection, % | 6.5 | 3.4 | 78 | 7.3 | 5.3 |
| Air Porosity, ft$^3$/min/ft$^2$ | 48 | 63 | 9 | 73 | 41 |
| Color-Eye Reflectance, % | 58 | 89 | 60 | 76 | 90 |

TABLE XXIV

| | Formulations | | | | | |
|---|---|---|---|---|---|---|
| Example | V | W | X | 108 | 109 | 110 |
| Polymer/Polyol | | | | | | |
| PP-2 | 100 | — | — | — | — | — |
| PP-1 | — | 100 | — | — | — | — |
| PP-5 | — | — | 100 | — | — | — |
| Same or similar as Ex. 93 | — | — | — | 100 | — | — |
| Same or similar as Ex. Ex. 55 | — | — | — | — | 100 | — |
| Same or similar as Ex. 56 | — | — | — | — | — | 100 |
| Water | 4.0 | 4.0 | 4.0 | 4.0 | 4.0 | 4.0 |
| Silicone Surfactant I | 1.0 | 1.0 | 0.3 | 1.0 | 1.0 | 1.0 |
| Tertiary Amine Catalyst | 0.1 | 0.1 | 0.1 | 0.1 | 0.1 | 0.125 |
| Stannous Octoate | 0.2 | 0.2 | 0.125 | 0.3 | 0.2 | 0.2 |
| TDI, Index 110 | 48.5 | 58.8 | 46.9 | 48.8 | 49.0 | 48.2 |
| Foam Physical Properties | | | | | | |
| Rise time, secs. | | | | | | 83 |
| Density, lb/ft$^3$ | 1.47 | 1.56 | 1.70 | 1.55 | 1.54 | 1.54 |
| Hardness, 4-Inch, ILD, lb/50 in$^2$ | | | | | | |
| 25% deflection | 88 | 72 | 119 | 93 | 90 | 102.8 |
| 65% deflection | 175 | 133 | >250 | 169 | 171 | 187.3 |
| 25% return | 48 | 40 | 54 | 45 | 47 | 44.5 |
| Support factor | | | | | | |
| Tensile Strength, psi | 21 | 22 | 24 | 18 | 22 | 19 |
| Tear Resistance, lb/in | 2.2 | 3.0 | 2.9 | 1.4 | 2.0 | 1.8 |
| Elongation, % | 85 | 140 | 90 | 65 | 95 | 70 |
| Compression Set from 90% Deflection, % | 15 | 6.5 | 40 | 33 | 18 | — |
| Air Porosity, ft$^3$/min/ft$^2$ | 61 | 85 | 73 | 70 | 66 | 40 |
| Color-Eye Reflectance, % | 42 | 73 | 51 | 59 | 80 | — |
| Resiliency, % ball rebound | | | | | | 27 |
| Compression set Cd %, 75% defl. | | | | | | 60 |

TABLE XXV

| | Formulations | | | | | | |
|---|---|---|---|---|---|---|---|
| Example | 111 | 112 | Y | 113 | 114 | 115 | Z |
| Polymer/Polyol | | | | | | | |
| Same or similar as Ex. 93 | 100 | 50 | — | 100 | 75 | 50 | — |
| Polyol H | — | 50 | 100 | — | 25 | 50 | 100 |
| Water | 2.5 | 2.5 | 2.5 | 4.0 | 4.0 | 4.0 | 4.0 |
| Silicone Surfactant I | 0.5 | 0.5 | 0.5 | 1.0 | 1.0 | 1.0 | 1.0 |
| Tertiary Amine Catalyst | 0.2 | 0.2 | 0.2 | 0.1 | 0.1 | 0.1 | 0.1 |
| Stannous Octoate | 0.25 | 0.225 | 0.15 | 0.3 | 0.25 | 0.25 | 0.225 |
| TDI, Index 110 | 32.8 | 34.8 | 36.8 | 48.8 | 49.8 | 50.7 | 52.7 |
| Foam Physical Properties | | | | | | | |
| Density, lb/ft$^3$ | 2.31 | 2.17 | 2.29 | 1.55 | 1.46 | 1.48 | 1.52 |
| Hardness, 4-Inch ILD, lb/50 in$^2$ | | | | | | | |
| 25% deflection | 108 | 73 | 48 | 93 | 78 | 72 | 76 |
| 65% deflection | 215 | 138 | 95 | 169 | 146 | 133 | 103 |
| 25% return | 68 | 51 | 39 | 45 | 43 | 43 | 37 |
| Tensile Strength, psi | 22 | 18 | 11 | 18 | 17 | 18 | 14 |
| Tear Resistance, lb/in | 1.3 | 1.8 | 0.7 | 1.4 | 1.6 | 1.7 | 1.5 |
| Elongation, % | 75 | 115 | 90 | 65 | 85 | 105 | 110 |
| Compression Set from 90% Deflection, % | 7.3 | 3.2 | 2.0 | 33 | 11 | 7.1 | 3.7 |
| Air Porosity, ft$^3$/min/ft$^2$ | 73 | 48 | 65 | 70 | 60 | 59 | 75 |
| Color-Eye Reflectance, % | 76 | 81 | 94 | 59 | 71 | 74 | 94 |

TABLE XXVI

| | Formulations | | | | | | | | |
|---|---|---|---|---|---|---|---|---|---|
| Example | 116 | 117 | AA | 118 | 119 | 120 | 121 | BB | 122 |
| Polymer/Polyol | | | | | | | | | |
| same or similar to Ex. 55 | 100 | 50 | — | 100 | 75 | 50 | 25 | — | 100 |
| Polyol H | — | 50 | 100 | — | 25 | 50 | 75 | 100 | — |
| Blowing Agent 1 | — | — | — | — | — | — | — | — | 20 |
| Water | 2.5 | 2.5 | 2.5 | 4.0 | 4.0 | 4.0 | 4.0 | 4.0 | 5.0 |

TABLE XXVI-continued

| | | | | | | | | | | | |
|---|---|---|---|---|---|---|---|---|---|---|---|
| Silicone Surfactant I | 0.5 | 0.5 | 0.5 | 1.0 | 1.0 | 1.0 | 1.0 | 1.0 | 1.3 | | 1.5 |
| Tert. Amine Catalyst | 0.2 | 0.2 | 0.2 | 0.1 | 0.1 | 0.1 | 0.1 | 0.1 | 0.1 | | 0.1 |
| Stannous Octoate | 0.2 | 0.2 | 0.15 | 0.2 | 0.2 | 0.2 | 0.2 | 0.225 | 0.225 | | 0.25 |
| TDI | 32.8 | 34.8 | 36.8 | 49.0 | 50.0 | 50.9 | 51.8 | 52.7 | 62.4 | | 73.5 |
| Index | 110 | 110 | 110 | 110 | 110 | 110 | 110 | 110 | 115 | | 115 |
| Foam Physical Properties | | | | | | | | | | | |
| Density, lb/ft³ | 2.26 | 2.21 | 2.29 | 1.54 | 1.52 | 1.51 | 1.56 | 1.52 | 0.80 | 0.80 | |
| Hardness, 4-Inch ILD, lb/50 in² | | | | | | | | | | | |
| 25% deflection | 103 | 69 | 48 | 90 | 69 | 66 | 59 | 56 | 36 | 36 | |
| 65% deflection | 201 | 130 | 95 | 171 | 132 | 122 | 112 | 103 | 64 | 72 | |
| 25% return | 68 | 49 | 39 | 47 | 40 | 39 | 39 | 37 | 17 | 15 | |
| Tensile Strength, psi | 27 | 20 | 11 | 22 | 21 | 21 | 18 | 14 | 10 | 11 | |
| Tear Resistance, lb/in | 2.2 | 2.0 | 0.7 | 2.0 | 2.6 | 2.5 | 2.0 | 1.5 | 1.3 | 1.2 | |
| Elongation, % | 95 | 120 | 90 | 95 | 110 | 105 | 100 | 110 | 70 | 70 | |
| Compression Set from 90% Deflection, % | 5.3 | 3.1 | 2.0 | 18 | 7.1 | 6.5 | 4.5 | 3.7 | 30 | 78 | |
| Air Porosity, ft³/min/ft² | 41 | 64 | 65 | 66 | 78 | 78 | 79 | 75 | 172 | 78 | |
| Color-Eye Reflectance, % | 90 | 91 | 94 | 80 | 81 | 83 | 86 | 94 | 80 | 75 | |

TABLE XXVII

| | Formulations | | | | | |
|---|---|---|---|---|---|---|
| Example | CC | DD | 124 | EE | FF | 125 |
| Polymer/Polyol | | | | | | |
| PP-2 | 100 | — | — | 100 | — | — |
| PP-5 | — | 100 | — | — | 100 | — |
| Same or similar to Ex. 55 | — | — | 100 | — | — | 100 |
| Water | 2.5 | 2.5 | 2.5 | 4.0 | 4.0 | 4.0 |
| Silicone Surfactant I | 0.5 | 0.2 | 0.5 | 1.0 | 1.0 | 1.0 |
| Tertiary Amine Catalyst | 0.2 | 0.3 | 0.2 | 0.1 | 0.1 | 0.1 |
| Stannous Octoate | 0.15 | 0.04 | 0.2 | 0.2 | 0.125 | 0.2 |
| TDI, Index 110 | 32.5 | 30.9 | 32.8 | 48.5 | 46.9 | 49.0 |
| Foam Physical Properties | | | | | | |
| Density, lb/ft³ | 2.30 | 2.37 | 2.26 | 1.47 | 1.70 | 1.54 |
| Hardness, 4-Inch ILD, lb/50 in² | | | | | | |
| 25% deflection | 122 | 127 | 103 | 88 | 119 | 90 |
| 65% deflection | >250 | >250 | 201 | 175 | >250 | 171 |
| Normalized ILD values, 2.30 pcf/1.50 pcf and 30.1% solids | | | | | | |
| 25% deflection | 122 | 125 | 111 | 90 | 106 | 91 |
| 65% deflection | >250 | >250 | 217 | 179 | — | 173 |

TABLE XXVIII

| Example | GG | HH | 126 | II | 127 |
|---|---|---|---|---|---|
| Polymer/polyol: | | | | | |
| Type | PP-4 | PP-1 | Same or similar to Ex. 91 | PP-1 | Same or similar to Ex. 91 |
| Amount | 100 | 100 | 100 | 100 | 100 |
| Water | 5.0 | 5.0 | 6.0 | 6.0 | |
| Amine Catalyst | 0.13 | 0.10 | 0.10 | 0.10 | 0.10 |
| Silicone Surfactant I | 1.0 | 1.0 | 1.0 | 1.0 | 1.0 |
| Stannous Octoate | 0.25 | 0.25 | 0.25 | 0.20 | 0.20 |
| TDI Index | 105 | 105 | 105 | 105 | 105 |
| Cream Time, seconds | — | 11 | 11 | 11 | 11 |
| Rise Time, seconds | 132 | 74 | 77 | 85 | 87 |
| Density, pcf | — | 1.20 | 1.22 | 1.07 | 1.11 |
| Breathability, SCFM | — | 1.0 | 1.7 | 3.3 | 3.5 |
| Reflectance*, center, % | 63 | 69 | 77 | 57 | 74 |

*Reflectance values were measured on hand-mixed foam with an approximate block size of 22" × 22" × 24". Center block cross-sections were used for measurement.

Tables XXIII–XXVI and XXVII also illustrate the relatively high load bearing properties and high reflectance or resistance to discoloration of some of the foams made pursuant to this invention as compared to foams made outside the invention.

EXAMPLES 128-134 and JJ-PP

A series of machine foams were made using the machine processing conditions as listed in Table XXIX and using the formulations set forth in Tables XXX through XXXII. The foams were evaluated using evaluation methods described hereinabove and their physical properties are given in Tables XXX through XXXII. Reflectance Δ is calculated by subtracting the reflectance measured at the block center from the reflectance measured at the outer edge. The reflectance at the outer edge and at the block center are measured at 440 nm. A reflectance Δ of about ten units or less is believed to usually appear uniform to the human eye.

TABLE XXIX

MACHINE PROCESSING CONDITIONS

| | |
|---|---|
| Machine | Low Pressure |
| Steam Temperature | 72° F |
| Mixer Type | Pin |
| Mixer Speed, rpm | 5000 |
| Nozzle Size | 1 inch |
| Conveyor Speed | 3 – 5 ft./min. |
| Conveyor Angle | 3.5 degrees |
| Total Throughput | 65 lbs/min. |
| Block Cross-section | 30" × 20" to 24" |

| Stream | Composition |
|---|---|
| I | Polymer/polyol |
| | Water |
| | Tert. Amine Catalyst |
| II | Silicone Surfactant I |
| III | Stannous Octoate |
| IV | TDI |

TABLE XXX

FOAM PHYSICAL PROPERTY DATA
WATER 3.5 PHR

| Example | JJ | KK | 128 | 129 |
|---|---|---|---|---|
| Polymer/polyol: | | | | |
| PP-1 | 100 | 100 | — | — |
| Same or similar to Ex. 91 | — | — | 100 | 100 |
| Water | 3.5 | 3.5 | 3.5 | 3.5 |
| Tert. Amine Catalyst | 0.14 | 0.14 | 0.14 | 0.14 |
| Silicone Surfactant I | 1.0 | 1.0 | 1.0 | 1.0 |
| TDI | 42.4 | 42.4 | 42.35 | 42.35 |
| Isocyanate Index | 107 | 107 | 107 | 107 |
| Cream Time, sec. | 4 | 3.5 | 4 | 4 |
| Rise Time, sec. | 103 | 90 | 95 | 90 |
| Density, pcf | 1.82 | 1.80 | 1.78 | 1.75 |
| Breathability, SCFM | 2.7 | 2.2 | 2.6 | 2.1 |
| ILD 4 in/50 in²* | | | | |
| 25% deflection | 73 | 75 | 72 | 71 |
| 65% deflection | 135 | 138 | 131 | 134 |

TABLE XXX-continued
FOAM PHYSICAL PROPERTY DATA
WATER 3.5 PHR

| Example | JJ | KK | 128 | 129 |
|---|---|---|---|---|
| Return Value, % | 57 | 58 | 55 | 57 |
| Load Ratio | 1.84 | 1.85 | 1.83 | 1.88 |
| Tensile, psi | 24 | 23 | 23 | 23 |
| Elongation, % | 149 | 132 | 166 | 166 |
| Tear, lbs/in | 3.1 | 3.2 | 4.0 | 3.5 |
| Compression Set, 90% | 6.1 | 5.7 | 6.5 | 6.6 |
| Reflectance Δ, % (O-M) | 9.2 | 9.7 | 6.4 | 5.8 |

*Foam ILD values normalized to 1.80 pcf.

TABLE XXXI
FOAM PHYSICAL PROPERTY DATA
WATER 4.0 PHR

| Example | LL | MM | NN | 130 | 131 | 132 |
|---|---|---|---|---|---|---|
| Polymer/polyol: PP-1 | 100 | 100 | 100 | — | — | — |
| Same or similar to Ex. 91 | — | — | — | 100 | 100 | 100 |
| Water | 4.0 | 4.0 | 4.0 | 4.0 | 4.0 | 4.0 |
| Tert. Amine Catalyst | 0.14 | 0.14 | 0.14 | 0.14 | 0.14 | 0.14 |
| Silicone Surfactant I | 1.0 | 1.0 | 1.0 | 1.0 | 1.0 | 1.0 |
| Stannous Octoate | 0.20 | 0.20 | 0.20 | 0.20 | 0.20 | 0.20 |
| TDI | 47.6 | 48.9 | 51.1 | 47.5 | 48.9 | 51.1 |
| Isocyanate Index | 107 | 110 | 115 | 107 | 110 | 115 |
| Cream Time, sec. | 3.5 | 4 | 5 | 5 | 5 | 5 |
| Rise Time, sec. | 80 | 86 | 85 | 90 | 82 | 82 |
| Density, pcf | 1.56 | 1.50 | 1.49 | 1.54 | 1.52 | 1.51 |
| Breathability, SCFM | 2.6 | 2.6 | 2.4 | 2.2 | 2.2 | 2.0 |
| ILD, 4 in/50 in²* | | | | | | |
| 25% deflection | 66 | 68 | 71 | 67 | 67 | 69 |
| 65% deflection | 126 | 127 | 136 | 126 | 127 | 135 |
| Return Value, % | 54 | 53 | 53 | 53 | 53 | 52 |
| Load Ratio | 1.91 | 1.86 | 1.91 | 1.89 | 1.89 | 1.94 |
| Tensile, psi | 22 | 23 | 24 | 24 | 23 | 23 |
| Elongation, % | 150 | 140 | 128 | 148 | 149 | 140 |
| Tear, lbs/in | 3.2 | 3.4 | 3.2 | 3.4 | 3.8 | 3.3 |
| Compression Set, 90% | 7.5 | 8.4 | 11 | 8.7 | 10 | 12 |
| Reflectance, Δ, % (O-M) | 16.5 | 19.4 | 19.6 | 8.6 | 13.1 | 13.9 |

*Foam ILD values are normalized to 1.50 pcf.

TABLE XXXII
FOAM PHYSICAL PROPERTY DATA
WATER 4.5 PHR

| Example | OO | PP | 133 | 134 |
|---|---|---|---|---|
| Polymer/polyol: PP-1 | 100 | 100 | — | — |
| Same or similar to Ex. 91 | — | — | 100 | 100 |
| Water | 4.5 | 4.5 | 4.5 | 4.5 |
| Tert. Amine Catalyst | 0.14 | 0.14 | 0.14 | 0.14 |
| Silicone Surfactant I | 1.2 | 1.2 | 1.2 | 1.2 |
| Stannous Octoate | 0.20 | 0.225 | 0.20 | 0.225 |
| TDI | 52.8 | 52.8 | 52.7 | 52.7 |
| Isocyanate Index | 107 | 107 | 107 | 107 |
| Cream Time, sec. | 5 | 5 | 5.5 | 5.5 |
| Rise Time, sec. | 85 | 84 | 85 | 85 |
| Density, pcf | 1.43 | 1.39 | 1.40 | 1.43 |
| Breathability, SCFM | 2.6 | 2.2 | 2.3 | 2.0 |
| ILD, 4 in/50 in²* | | | | |
| 25% deflection | 61 | 63 | 64 | 64 |
| 65% deflection | 115 | 119 | 122 | 118 |
| Return Value, % | 54 | 52 | 50 | 52 |
| Load Ratio | 1.90 | 1.90 | 1.89 | 1.85 |
| Tensile, psi | 23 | 23 | 22 | 19 |
| Elongation | 151 | 152 | 158 | 166 |
| Tear, lbs/in. | 3.4 | 3.3 | 3.7 | 3.6 |
| Compression Set, 90% | 10 | 12 | 13 | 12 |
| Reflectance, Δ, % (O-M) | 21.8 | 21.3 | 16.5 | 15.3 |

*Foam ILD values normalized to 1.43 pcf.

EXAMPLES 135-138 AND QQ-TT

Using the procedure described in respect to Examples 94-127 and P-II several foams were prepared from the materials listed in Table XXXIII below. The formulations each contained, as a flame retardant, tris(2,3-dibromopropyl) phosphate in different amounts as given in Table XXXIII. Each foam was tested for combustibility pursuant to procedures described in California Bulletin 117 and results are given in Table XXXIII. These results are not intended to reflect hazards presented by this or any other material under actual fire conditions and show the materials of this invention to provide improved performance.

TABLE XXXIII

| Example | QQ | RR | SS | TT | 135 | 136 | 137 | 138 |
|---|---|---|---|---|---|---|---|---|
| Polymer/polyol: PP-1 | 100 | 100 | 100 | 100 | — | — | — | — |
| Same or similar to Ex. 91 | — | — | — | — | 100 | 100 | 100 | 100 |
| Water | 4.0 | 4.0 | 4.0 | 4.0 | 4.0 | 4.0 | 4.0 | 4.0 |
| Tertiary Amine Catalyst | 0.14 | 0.14 | 0.14 | 0.14 | 0.14 | 0.14 | 0.14 | 0.14 |
| Silicone Surfactant III | 1.0 | 1.0 | 1.0 | 1.0 | 1.0 | 1.0 | 1.0 | 1.0 |
| Tris(2,3-dibromopropyl) phosphate | 5 | 7.5 | 10 | 12.5 | 5 | 7.5 | 10 | 12.5 |
| Stannous Octoate | 0.225 | 0.225 | 0.225 | 0.225 | 0.225 | 0.225 | 0.225 | 0.225 |
| TDI Index | 105 | 105 | 105 | 105 | 105 | 105 | 105 | 105 |
| Cream Time, sec. | 10 | 10 | 10 | 10 | 10 | 10 | 10 | 10 |
| Rise Time, sec. | 82 | 84 | 85 | 87 | 82 | 85 | 87 | 89 |
| Height of Rise | 8.8 | 9.0 | 8.8 | 8.9 | 8.5 | 8.5 | 8.6 | 8.6 |
| Breathability (SCFM) | 2.3 | 2.4 | 2.1 | 1.8 | 2.0 | 2.1 | 2.0 | 2.1 |
| Cells per inch | 60-65 | | | | | | | |
| Density, pcf | 1.52 | 1.53 | 1.58 | 1.60 | 1.55 | 1.60 | 1.59 | 1.62 |
| California Bulletin 117 | | | | | | | | |
| Burn Extent, Av. (in.) | 10.5 | 7.2 | 4.3 | 4.5 | 9.3 | 4.7 | 4.5 | 3.7 |
| Afterflame, Av. (sec.) | 29 | 13 | 2.6 | 3.8 | 2.5 | 5.6 | 4.2 | 2.2 |

EXAMPLES 139-141

Using the procedure described in Examples 128-134 foams were prepared from the materials listed in Table XXXIV below. The formulations each contained, as a flame retardant, a chlorinated phosphate (Stauffer's FR-2) in different amounts as given in Table XXXIV. Each foam was tested for combustibility pursuant to procedures described in California Bulletin 117 and results are given in Table XXXIV. These results are not intended to reflect hazards presented by this or any other material under actual fire conditions.

TABLE XXXIV

| Example | 139 | 140 | 141 |
|---|---|---|---|
| Polymer/polyol Same or similar to Ex. 91 | 100 | 100 | 100 |
| Stauffer's FR-2, a chlorinated phosphate | 7.0 | 10.0 | 15.0 |
| Water | 3.0 | 3.0 | 3.0 |
| Tertiary Amine Catalyst | 0.14 | 0.14 | 0.14 |

TABLE XXXIV-continued

| Example | 139 | 140 | 141 |
|---|---|---|---|
| Silicone Surfactant III | 1.2 | 1.2 | 1.5 |
| Stannous Octoate | 0.2 | 0.225 | 0.225 |
| TDI, Index 110 | 38.2 | 38.2 | 38.2 |
| Cream/Rise Times | 4.5/114 | 5.0/110 | 5.5/126 |
| Density, pcf | 2.07 | 2.08 | 2.17 |
| Porosity | 35 | 35 | 40 |
| 4" ILD, lbs/50 in.² | | | |
| 25% deflection | 63 | 58 | 55 |
| 65% deflection | 121 | 116 | 109 |
| 25% return | 40 | 39 | 36 |
| Load Ratio | 1.94 | 1.99 | 1.98 |
| Tensile, psi | 22 | 23 | 22 |
| Tear, lbs. | 3.3 | 3.2 | 3.0 |
| Elongation, % | 151 | 166 | 180 |
| Compression Set, 90% | 5.5 | 5.5 | 8.1 |
| California Bulletin 117 | | | |
| Char Length, ins. | 10.9 | 8.2 | 2.7 |
| Afterflame, secs. | 32 | 25 | 3.6 |

What is claimed is:

1. In a polymer/polyol composition which is convertible by reaction with a polyisocyanate to a polyurethane product wherein said polymer/polyol composition is normally liquid at the temperature at which said composition is converted to said polyurethane product and wherein the polymer of said polymer/polyol composition is formed in situ in a polyol blend containing a polyol having a relatively low theoretical number average molecular weight by polymerizing in the blend one or more polymerizable ethylenically unsaturated monomers, the improvement comprising employing as the blend a polyol blend comprising about 55 to about 95 wt.% of a polyol having a theoretical number average molecular weight not greater than about 4000 and from about 45 to about 5 wt.% of a polyol having a theoretical number average molecular weight of not less than about 5000, in which blend said polymer is stably dispersed as small particles, said polymer being formed in the absence of any alkyl mercaptan and said monomers being substantially free of chemically bound halogen.

2. Composition as claimed in claim 1 wherein said polyol blend comprises about 70 to about 90 wt.% of the polyol having a theoretical number average molecular weight not greater than about 4000 and about 10 to about 30 wt.% of the polyol having a theoretical number average molecular weight of not less than about 5000.

3. Composition as claimed in claim 1 wherein said polyol blend comprises about 70 to about 95 wt.% of the polyol having a theoretical number average molecular weight not greater than about 4000 and about 5 to about 30 wt.% of the polyol having a theoretical number average molecular weight of not less than about 5000.

4. Composition as claimed in claim 1 wherein said polyol blend comprises about 80 to about 90 wt.% of the polyol having a theoretical number average molecular weight not greater than about 4000 and about 10 to about 20 wt.% of the polyol having a theoretical number average molecular weight of not less than about 5000.

5. Composition as claimed in claim 1 wherein the amount of polymer dispersed in said polyol blend is about 4 to about 40 wt.% based on the weights of the composition.

6. Composition as claimed in claim 1 wherein the amount of polymer dispersed in said polyol blend is about 15 to about 35 wt.% based on the weight of the composition.

7. Composition as claimed in claim 6 wherein said polymer comprises polymerized acrylonitrile.

8. Composition as claimed in claim 7 wherein said polymer also contains polymerized styrene.

9. Composition as claimed in claim 8 wherein the weight ratio of polymerized acrylonitrile to polymerized styrene in said polymer ranges from 20:80 to 100:0.

10. Composition as claimed in claim 9 wherein the weight ratio of polymerized acrylonitrile to polymerized styrene in said polymer ranges from 25:75 to 100:0.

11. Composition as claimed in claim 9 wherein the weight ratio of polymerized acrylonitrile to polymerized styrene in said polymer ranges from about 40:60 to 85:15.

12. Composition as claimed in claim 9 wherein the weight ratio of polymerized acrylonitrile to polymerized styrene in said polymer ranges from about 60:40 to 85:15.

13. Composition as claimed in claim 7 wherein said polymer also contains polymerized methyl methacrylate.

14. Composition as claimed in claim 1 wherein the weight ratio of polymerized acrylonitrile to polymerized methyl methacrylate to polymerized styrene is about 25 to about 25 to about 50.

15. Composition as claimed in claim 1 wherein the theoretical number average molecular weight of the polyol having the lower molecular weight is in the range of about 400 to about 4000 and that of the polyol having the higher molecular weight is in the range of about 5000 to about 20000.

16. Composition as claimed in claim 1 wherein the theoretical number average molecular weight of the polyol having the lower molecular weight is in the range of about 1000 to about 4000 and that of the polyol having the higher molecular weight is in the range of about 5000 to about 15000.

17. A method for producing a polyurethane foam by reacting and foaming a mixture comprising (a) the polymer/polyol composition claimed in claim 1, (b) an organic polyisocyanate, (c) a catalyst for the reaction of (a) and (b) to produce the polyurethane, (d) a blowing agent and (e) a foam stabilizer.

18. A method as claimed in claim 17 wherein the foam is a flexible foam, the reaction and foaming are performed by the one shot technique, the polymer/polyol composition contains an alkylene oxide adduct of a polyhydroxyalkane, the blowing agent is water and the water is used in an amount to provide a foam having a density of less than 1.75 pounds per cubic foot.

19. A composition as claimed in claim 1 wherein said polyol having a number average molecular weight not greater than about 4,000 consists of an alkylene oxide adduct of a polyhydroxy alkane and the polyol having a number average molecular weight of not less than about 5,000 consists of an alkylene oxide adduct of a polyhydroxy alkane.

20. A method for producing a polyurethane elastomer by reacting a mixture comprising (a) a polymer/polyol composition as claimed in claim 1 and (b) an organic polyisocyanate, in the presence of (c) a catalyst for the reaction of (a) and (b) to produce the polyurethane.

21. A method for producing a polyurethane elastomer as claimed in claim 20 wherein said polyol having a number average molecular weight not greater than about 4,000 consists of an alkylene oxide adduct of a polyhydroxy alkane and the polyol having a number average molecular weight of not less than about 5,000 consists of an alkylene oxide adduct of a polyhydroxy alkane.

22. In a process for producing a liquid polymer/polyol composition which is convertible by reaction with a polyisocyanate to a polyurethane product wherein said polymer/polyol composition is normally liquid at the temperature at which said composition is converted to said polyurethane product and wherein said polymer of said polymer/polyol composition is formed in situ in a polyol blend which contains a polyol having a relatively low theoretical number average molecular weight by polymerizing in the blend one or more polymerizable ethylenically unsaturated monomers, the improvement comprising employing as the blend a polyol blend comprising about 55 to 95 wt.% of a polyol having a theoretical number average molecular weight not greater than about 4000 and from about 45 to about 5 wt.% of a polyol having a theoretical number average molecular weight of not less than about 5000, in which blend said polymer is formed in situ in the absence of any alkyl mercaptan from one or more of said monomers, said monomers being substantially free of bound halogen, and said polymer is stably dispersed in said blend as small particles.

23. Process as claimed in claim 22 wherein said polyol blend comprises about 70 to about 95 wt.% of the polyol having a theoretical number average molecular weight not greater than about 4000 and about 5 to about 30 wt.% of the polyol having a theoretical number average molecular weight of not less than about 5000.

24. Process as claimed in claim 22 wherein said catalyst is 2,2'-azo-bis-isobutyronitrile.

25. Process as claimed in claim 22 wherein said catalyst is a peroxyester free radical catalyst.

26. A process as claimed in claim 22 wherein said polyol having a number average molecular weight not greater than about 4,000 consists of an alkylene oxide adduct of a polyhydroxy alkane and the polyol having a number average molecular weight of not less than about 5,000 consists of an alkylene oxide adduct of a polyhydroxy alkane.

* * * * *

UNITED STATES PATENT OFFICE
CERTIFICATE OF CORRECTION

Patent No. 4,119,586      Dated October 10, 1978

Inventor(s) Naresh Ramanlal Shah

It is certified that error appears in the above-identified patent and that said Letters Patent are hereby corrected as shown below:

First page, first column, under "References Cited", "Stanberger" should read -- Stamberger -- .

Column 1, line 51, "polyurethance" should be -- polyurethane -- .

Column 2, line 2, "glycols", should read -- glycol -- .

Column 11, line 2, "1,3-diisocyanato-o-xylene," should read -- 1,3-diisocyanato-o-xylene, -- ; line 3, "1,3-diisocyanato-m-xylene" should read -- 1,3-diisocyanato-m-xylene; line 3,"1,3-diisocyanato-p-xylene" should read -- 1,3-diisocyanato-p-xylene; and line 29, "ena" should read -- and -- .

Column 13, line 23 ("+C." should read -- °C. -- ; lines 48 and 49, "polyol first and the % of the high molecular weight polyol second." should read -- basis giving the % of the low molecular weight polyol first and the % of the high molecular weight polyol second. -- .

Column 15, Table II, under column headed "Example", after "Reaction", insert -- Temperature -- .

Column 16, Table I, under column headed "Example", after "Reaction", insert -- Temperature -- .

Column 21, Table IV, opposite "Polyol Blend," "I/II    I/II    I/III" should be -- J/II    J/II    J/III -- .

UNITED STATES PATENT OFFICE
CERTIFICATE OF CORRECTION

Patent No. 4,119,586    Dated October 10, 1978

Inventor(s) Naresh Ramanlal Shah

It is certified that error appears in the above-identified patent and that said Letters Patent are hereby corrected as shown below:

Column 23, Table VII-continued, in the column headed "F", delete the second occurrence of "Run Not Completed. Reactor Plugged.".

Column 23, after line 55, the formulas for Silicone Surfactant I and Silicone Surfactant II should read:

-- <u>Silicone Surfactant I</u>

$$MeSi[(OSiMe_2)_{6.4}(OC_2H_4)_{22.3}(OC_3H_6)_{16.4}OC_4H_9]_3$$

<u>Silicone Surfactant II</u>

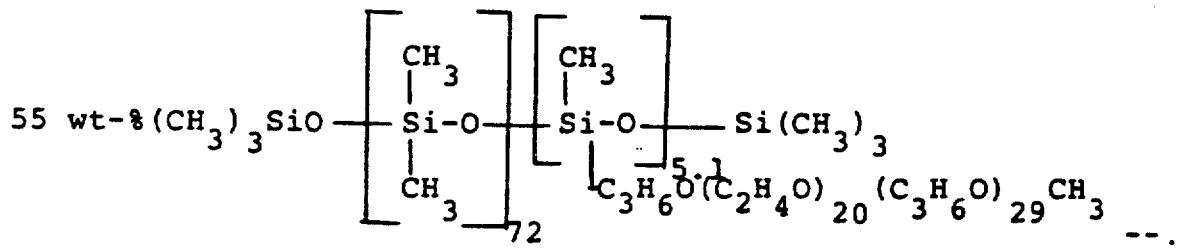

Column 24, center of column, the two formulas should read:

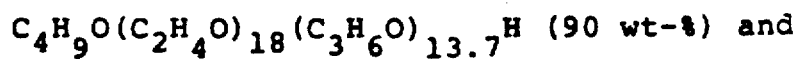

$$C_4H_9O(C_2H_4O)_{18}(C_3H_6O)_{13.7}H \quad (90 \text{ wt-\%}) \text{ and}$$

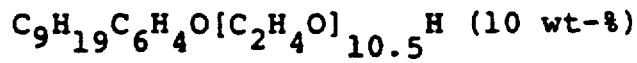

$$C_9H_{19}C_6H_4O[C_2H_4O]_{10.5}H \quad (10 \text{ wt-\%})$$

UNITED STATES PATENT OFFICE
CERTIFICATE OF CORRECTION

Patent No. 4,119,586  Dated October 10, 1978

Inventor(s) Naresh Ramanlal Shah

It is certified that error appears in the above-identified patent and that said Letters Patent are hereby corrected as shown below:

Column 25, Table VIII, under the column headed "41" and above "OK", "698" should read -- 98 --; Table IX, under the heading "Example", fourth line, "ft /min/ft " should read -- $ft^3/min/ft^2$ -- .

Column 26, Table X, under the column headed "Example", below "Air Porosity", "ft /min/ft " should read -- $ft^3/min/ft^2$ -- ; above "25%","in )" should read -- $in^2$) --; and above "50%", "C , %" should read -- $C_d$,% -- ; and Table XI, under the heading "Example", below "Air Porosity", "ft /min/ft " should read -- $ft^3/min/ft^2$ -- ; and below "Ball Rebound", "in)" should read -- $in^2$ -- and the 3 arrows should extend to the last column.

Column 27, Table XI, under the heading "Example", last line, "C %" should read -- $C_d$,% -- .

Columns 33 and 34, Table XIX, the twelfth through the nineteenth lines of the second column should be placed directly under the heading "91".

Column 35, Table XIX-continued, Note 1., last two lines, delete "now U.S. Pat. No.".

UNITED STATES PATENT OFFICE
CERTIFICATE OF CORRECTION

Patent No. 4,119,586　　　　　　　　Dated October 10, 1978

Inventor(s) Naresh Ramanlal Shah

It is certified that error appears in the above-identified patent and that said Letters Patent are hereby corrected as shown below:

Column 37, Table XXI, in the column headed "Example", below "Physical Properties", "Density, lbs/ft " should read -- Density, lbs/ft$^3$ -- ; "Air Porosity, ft / " should read -- Air Porosity, ft$^3$/ --; "min/ft " should read -- min/ft$^2$ -- ; "ILD(lbs/50 in )" should read -- ILD(lbs/50 in$^2$) -- : "Strength, lb/in " should read -- Strength, lb/in $^2$ -- ; "Set, C %" should read -- Set, C$_d$,% -- ; and Table XXII, in the column headed "Example", below "Air Porosity," "ft /min/ft" should read -- ft$^3$/min/ft$^2$ -- ; and below "rebound", "ILD(lbs/50in )" should read -- ILD(lbs/50 in$^2$) -- .

Column 39, Table XXIII, in the column headed "Example", below "Foam Physical Properties", "Density, lb/ft " should read -- Density, lb/ft$^3$ -- ; "lb/50 in " should read -- lb/50 in$^2$ --; and "Air Porosity, ft /min/ft " should read -- Air Porosity, ft$^3$/min/ft$^2$ -- .

Column 40, Table XXIV (continued), first column under "Foam Physical Properties", "ILD, lb/50 in " should read -- ILD, lb/50 in$^2$ -- ; "Density, lb/ft " should read -- Density, lb/ft$^3$ -- ; and "ft / min/ft " should read -- ft$^3$/min/ft$^2$ -- ; Table XXV, in the column headed "Example", under "Foam Physcial Properties", "Density, lb/ft " should read -- Density, lb/ft$^3$ -- ; " lb/50 in " should read -- lb/50 in$^2$ --; and "Air Porosity, ft /min/ft " should read "Air Porosity, ft$^3$/min/ft$^2$ -- ; and Table XXVI, insert the following as the last column -- 123
100
-
15
6.0 -- .

UNITED STATES PATENT OFFICE
CERTIFICATE OF CORRECTION

Patent No. 4,119,586　　　　　Dated　October 10, 1978

Inventor(s)　Naresh Ramanlal Shah

It is certified that error appears in the above-identified patent and that said Letters Patent are hereby corrected as shown below:

Column 41, Table XXVI-continued, first column, under "Foam Physical Properties", "Density, lb/ft " should read -- Density, lb/ft$^3$ -- ; and "ft /min/ft " should read -- ft$^3$/min/ft$^2$ --; Table XXVII , in the column headed "Example", under "Foam Physical Properties", "Density, lb/ft " should read -- Density, lb/ft$^3$ --; and Table XXVIII, in the column headed "126", below "100", "6.0" should read -- 5.0 -- , in the column headed "127", between "100" and "0.10", insert -- 6.0 -- .

Column 42, the first five numbers at the top of the column (i.e., 1.5, etc) should be moved to the left so as to become the first five numbers in the last column of Table XXVI-continued, Table XXIX, first column, below "Machine", "Steam Temperature" should read -- Stream Temperature -- ; and Table XXX, in the column headed "Example", between "Silicone Surfactant I" and "TDI", insert -- Stannous Octoate -- in the column headed "JJ", between the numerals "1.0" and "42.4", insert -- 0.175 --; in the column headed "KK", between the numerals "1.0" and "42.4", insert -- 0.20 --; in the column headed "128", between the numerals "1.0" and "42.35", insert -- 0.175 --; in the column headed "129", between the numerals "1.0" and "42.35", insert -- 0.20 --; and in the column headed "Example", third from last line, "ILD 4 in/50 in *" should read -- 4-Inch ILD, lb/50 in$^2$ * --.

Column 43, Table XXXI, in the column headed "Example", below "SCFM", "ILD, 4 in/50 in *" should read -- 4-Inch ILD, lb/50 in$^2$ * --.

UNITED STATES PATENT OFFICE
CERTIFICATE OF CORRECTION

Patent No. 4,119,586           Dated   October 10, 1978

Inventor(s) Naresh Ramanlal Shah

It is certified that error appears in the above-identified patent and that said Letters Patent are hereby corrected as shown below:

Column 44, Table XXXII-continued, in the column headed "Example", below "Breathability. SCFM", "ILD, 4 in/50 in " should read -- 4-Inch ILD, 50 lb/in$^2$ * --; and Table XXXIII, last column, the column heading "138" should be placed directly over the last column and the dash (-) under the "138" should be in the last column.

Column 45, Table XXXIV, in the column headed "Example" below "Porosity", "ILD, 4 in/50 in *" should read -- 4-Inch ILD, 50 lb/in$^2$ * --.

Signed and Sealed this

Twenty-fourth Day of April 1979

[SEAL]

Attest:

RUTH C. MASON
Attesting Officer

DONALD W. BANNER
Commissioner of Patents and Trademarks